United States Patent [19]

Walker

[11] Patent Number: 5,045,214

[45] Date of Patent: Sep. 3, 1991

[54] METHODS FOR REMOVING SUBSTANCES FROM AQUEOUS SOLUTIONS

[75] Inventor: Douglas T. Walker, Elk Grove Village, Ill.

[73] Assignee: Union Oil Company of California, Los Angeles, Calif.

[21] Appl. No.: 359,872

[22] Filed: May 31, 1989

Related U.S. Application Data

[63] Continuation-in-part of Ser. No. 42,565, Apr. 16, 1987, which is a continuation of Ser. No. 477,212, Mar. 22, 1983.

[51] Int. Cl.$^5$ .............................................. C02F 1/20
[52] U.S. Cl. ........................................ 210/717; 55/53; 210/718; 210/722; 210/724; 210/726; 210/904; 210/908; 210/912
[58] Field of Search ................................ 75/108, 609; 204/DIG. 13; 210/702, 708, 714, 718, 721, 722, 724, 726, 738, 717, 750, 758, 912–914, 904, 908; 55/53, 38

[56] References Cited

U.S. PATENT DOCUMENTS

| 360,126 | 3/1887 | Tweeddale | 210/722 |
|---|---|---|---|
| 961,764 | 6/1910 | Falding | 423/144 |
| 1,824,936 | 9/1931 | Travers | 210/722 |
| 1,994,702 | 3/1935 | Harris | 23/200 |
| 2,144,051 | 1/1939 | Frankforter | 210/16 |
| 2,192,154 | 2/1940 | Schuermann et al. | 75/108 |
| 2,656,282 | 10/1953 | Clarke | 106/304 |
| 2,692,229 | 10/1954 | Heise et al. | 210/2 |
| 2,982,608 | 5/1961 | Clement | 23/89 |
| 3,084,123 | 4/1963 | Hund | 252/62.56 |
| 3,100,158 | 8/1963 | Lemaire et al. | 117/49 |
| 3,347,787 | 10/1967 | Rhodes | 210/50 |
| 3,475,282 | 10/1969 | Hamilton | 203/49 |
| 3,617,559 | 11/1971 | Cywin | 210/46 |
| 3,619,137 | 11/1971 | Ratcliffe | 23/200 |
| 3,738,932 | 6/1973 | Kostenbader | 210/46 |

(List continued on next page.)

FOREIGN PATENT DOCUMENTS

| 2640096 | 6/1976 | Fed. Rep. of Germany . |
|---|---|---|
| 604262 | 5/1926 | France . |
| 2210574 | 12/1973 | France . |
| 2591584 | 9/1985 | France . |
| 24770 | 10/1968 | Japan . |
| 49-11777 | 2/1974 | Japan . |
| 51971 | 5/1975 | Japan . |
| 65050 | 6/1975 | Japan . |
| 67156 | 6/1977 | Japan . |
| 35252 | 4/1978 | Japan . |
| 43673 | 4/1978 | Japan . |
| 67956 | 6/1978 | Japan . |
| 41270 | 4/1979 | Japan . |
| 152613 | 12/1979 | Japan . |

(List continued on next page.)

OTHER PUBLICATIONS

Merrill et al., Journal Water Pollution Control Federation, 58 (1):18–29 (Jan. 1986).
Chemical Abstracts, 79 (8):191, Abstract 45500K.
Denver Toluene Site, Unipure Treatment of the Recovered Ground Water (Jan. 29, 1988).

(List continued on next page.)

Primary Examiner—Peter Hruskoci
Attorney, Agent, or Firm—Gregory F. Wirzbicki; Shlomo R. Frieman

[57] ABSTRACT

Methods are provided for removing contaminants from an aqueous solution to yield a less contaminated aqueous effluent. In one embodiment of the invention, the method comprises coprecipitating non-volatile contaminants (i.e., heavy metals, light metals, cyanide, phenolics, oil and grease, TSS, BOD, COD, and/or TOC) with a carrier precipitate which is formed in situ within the aqueous solution. In another embodiment of the invention, the method comprises partitioning volatile organic contaminants between a liquid phase and a gas phase. In yet a further embodiment, the above versions of the invention are simultaneously performed in the same reaction vessel.

98 Claims, 1 Drawing Sheet

U.S. PATENT DOCUMENTS

| | | | |
|---|---|---|---|
| 3,822,210 | 7/1974 | Iwase et al. | 252/62.64 |
| 3,847,807 | 11/1974 | Herman et al. | 210/46 |
| 3,926,754 | 12/1975 | Lee | 204/152 |
| 3,931,007 | 1/1976 | Sugano et al. | 210/717 |
| 3,947,502 | 3/1976 | Leitner et al. | 423/632 |
| 3,970,738 | 7/1976 | Matsui et al. | 423/140 |
| 4,032,466 | 6/1977 | Otrhalek et al. | 252/136 |
| 4,036,726 | 7/1977 | Gale et al. | 204/231 |
| 4,119,536 | 10/1978 | Iwase et al. | 210/50 |
| 4,123,339 | 10/1978 | Gale et al. | 204/149 |
| 4,132,636 | 1/1979 | Iwase et al. | 210/6 |
| 4,169,053 | 9/1979 | Sakakibara et al. | 210/913 |
| 4,211,646 | 7/1980 | Westbrook et al. | 210/15 |
| 4,312,760 | 1/1982 | Neville | 210/724 |
| 4,314,906 | 2/1982 | Dunn et al. | 210/908 |
| 4,318,788 | 3/1982 | Duffey | 204/149 |
| 4,343,706 | 8/1982 | Etzel et al. | 210/667 |
| 4,382,865 | 5/1983 | Sweeny | 210/743 |
| 4,405,464 | 9/1983 | Baldwin et al. | 210/717 |
| 4,572,400 | 6/1988 | Pearson | 210/750 |
| 4,606,829 | 8/1986 | Rice et al. | 210/713 |
| 4,724,084 | 2/1988 | Pahmeier et al. | 210/709 |
| 4,742,085 | 2/1988 | Pohoreski | 210/713 |
| 4,892,664 | 1/1990 | Miller | 210/750 |

FOREIGN PATENT DOCUMENTS

| | | | |
|---|---|---|---|
| 84/03692 | 9/1984 | PCT Int'l Appl. | |
| 1142214 | 2/1969 | United Kingdom | |
| 2035814 | 6/1980 | United Kingdom | 210/908 |

OTHER PUBLICATIONS

Evaulation & Proposal for a Wastewater Treatment Facility Employing Unipure Process Technology, Project #0001, (Feb. 2, 1988).

Evaluation & Proposal for a Wastewater Treatment Facility Employing Unipure Process Technology, Project #0003, (Feb. 23, 1988).

Engineering Evaluation/Cost Analysis for Denver Toluene Site, Roy F. Weston, Inc. Lakewood, Colo. (Dec., 1988).

Unipure Process Technology–An Efficient Wastewater Treatment & Polish Process, Dr. Evord F. Knights (Jun. 28, 1988).

Benjamin et al., *J. Water Pollution Control Federation*, 54 (11): 1472-1481 (1982).

Weiner, *Die Abwasser in der Metallindustrie*, pp. 150, 151, 156, and 157.

Takada et al., "Preparation of Ferrites by Wet Method", *Proccedings of the International Conference, Japan*, (1970).

Weiser, *Inorganic Colloid Colloid Chemistry, vol. II, The Hydrous Oxides and Hydroxides*, John Wiley & Sons, Inc., New York, N.Y. (1935).

David et al., *J. Colloid and Interface Science*, 67 (1):90-107 (1978).

Kelly et al., *Proceedings of the 37th Industrial Waste Conference, Purdue University*, Ann Arbor Science Publications, Ann Arbor, Mich., pp. 745-751 (1981).

Dyck, *Canadian J. Chemistry*, 46:1441-1444 (1968).

Wilms et al., *Advances in Waste Pollution Research, Proceedings of the Sixth International Conference;* Pergamon Press, Oxford, pp. 615-623 (1973).

Benjamin et al., *Proceedings of the 35th Industrial Waste Conference Purdue University*, Ann Arbor Science Publications, Ann Arbor, Mich. pp. 281-292 (1981).

Schwetmann, "*Uber die Synthese definierter Eisenoxyde unter verschiedenen Bedingungen*".

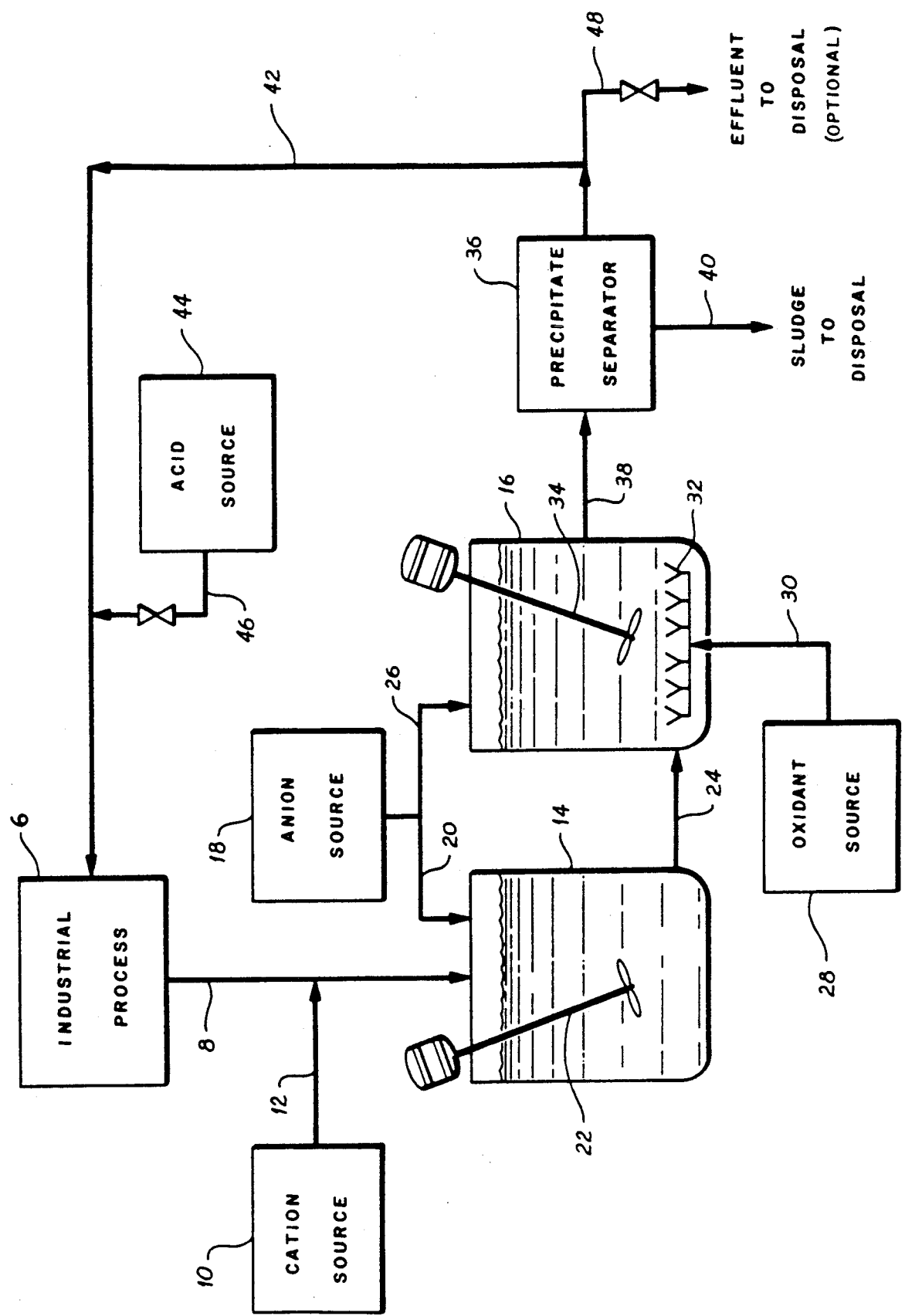

METHODS FOR REMOVING SUBSTANCES FROM AQUEOUS SOLUTIONS

CROSS-REFERENCE TO RELATED APPLICATIONS

This application is a continuation-in-part of application Ser. No. 07/042,565, filed Apr. 16, 1987, which is a continuation of abandoned application Ser. No. 06/477,212, filed Mar. 22, 1983.

BACKGROUND OF THE INVENTION

One aspect of this invention relates generally to the removal of heavy metals from aqueous solutions and, in particular, to the removal of heavy metals from aqueous solutions by the method of coprecipitation. As used herein, the term "heavy metals" refers to non-ferrous metals and metaloids (e.g., arsenic, selenium, and antimony) which have an atomic number greater than that of calcium.

There is increasing concern over the hazards posed by the rising levels of heavy metals within the world's water supplies. Most heavy metals are toxic to some degree to all life-forms. Aqueous concentrations of as little as 0.05 ppm can have a deleterious effect on aquatic flora and fauna. In humans, toxic heavy metal poisoning can lead to severe nervous system disorders and can cause death. Even trace amounts of heavy metals within an organism's environment are potentially dangerous, because heavy metals do not decompose over time (as do most organic pollutants) and often accumulate within the organism throughout its lifetime. This accumulative effect is accentuated in succeeding species along each food chain.

As a consequence of the increasing concern over aqueous heavy metal concentration levels, industry is being required to virtually eliminate heavy metals from its aqueous wastes. For many industries, however, this requirement is very difficult to fulfill. The metal finishing industries, for example, employ a variety of processes which generate large volumes of aqueous waste material. Many of these wastes contain high concentrations of heavy metals (often as high as 10 percent), including zinc, nickel, copper, chromium, lead, cadmium, tin, gold, and silver. The combined quantity of these wastes generated daily is very large (over one billion gallons in the United States), and the number of plants employing metal finishing processes is also large (nearly 8,000 in the United States). Numerous heavy metal removal methods have been proposed for the metal finishing industries, including dilution, evaporation, alkali-precipitation, absorption, dialysis, electrodialysis, reverse osmosis, and ion exchange, but none has been found to be entirely satisfactory.

By far the most common heavy metal removal method is alkali-precipitation. In this method, a sufficient quantity of base is added to the aqueous waste solution to precipitate the desired quantity of heavy metals as insoluble metal hydroxides. However, as governmental heavy metal regulations have become stricter, the alkali precipitation method has become exceedingly costly, more difficult to use, and in some instances inappropriate.

Alkali-precipitation must be carried out at high pH (between about 9 and about 12) in order to reduce the soluble heavy metal concentrations to within acceptable limits. Additive chemical volumes can therefore be quite high. Large quantities of base are required to raise the waste solution pH to treatment conditions and to precipitate the requisite quantity of heavy metals. Large quantities of acid are often required to reduce the pH of the resulting treated effluent prior to its recycle or disposal. Additive chemical unit costs are also quite high because a costly base, such as caustic soda, must be employed. The most preferable base, aqueous ammonia (because it is less expensive and easier to handle than caustic soda), is impractical in the alkali-precipitation method. At the high solution pH levels required by the alkali-precipitation method, aqueous ammonia forms soluble complexes with many heavy metal species (especially with copper, nickel, and zinc) thereby preventing their precipitation.

Waste streams containing hexavalent chromium, a common contaminant in many metal finishing industry waste solutions, require costly pretreatment because the alkali-precipitation method is ineffective in precipitating hexavalent chromium. The pretreatment step entails reducing the hexavalent chromium to the trivalent state by reaction with a suitable reducing agent, such as sodium bisulfite, at pH levels below 3. After pretreatment, the trivalent chromium is precipitated from the solution as a hydroxide by raising the solution pH to above about 9.

Waste streams containing organic and nitrogenous complexing agents, also common contaminants in many metal finishing industry waste solutions, require a specialized and especially costly alkali-precipitation treatment. To counter the tendency of the complexing agents to solubilize heavy metals, large quantities of calcium hydroxide must be added to the waste solution. The large quantities of base necessarily raise the pH of the solution to very high levels, and make necessary the eventual use of large quantities of acid to neutralize the resulting effluent. The necessary use of calcium hydroxide also results in significantly increased operating costs because calcium hydroxide exists as a slurry at treatment conditions and is, therefore, very difficult to handle and control. Furthermore, having to use calcium hydroxide in such high concentrations results in large precipitate sludge disposal costs because abnormally large volumes of sludge are produced. This abnormal sludge production stems from (a) the fact that, in addition to the formation of heavy metal precipitates, calcium precipitates are formed as well, and (b) the fact that calcium precipitates tend to retain a large amount of water.

Various light metals, e.g., beryllium and aluminum, are also undesirable contaminants. Prior art methods for removing light metals from aqueous systems are not satisfactory. For example, although aluminum can be removed by alkaline precipitation, the resulting flocculent or precipitate (aluminum tetrahydroxide) is very hygroscopic and is difficult to settle. In addition, alkaline precipitation is ineffective in treating concentrated aluminum solutions. Furthermore, aluminum readily redissolves out of the precipitate.

With respect to beryllium, beryllium is a small, hydrated, unreactive atom that is generally only removal from a solution by methods capable of removing sodium, e.g., ion chromatography.

Cyanide is also a hazardous contaminant. Although prior art methods for reducing the cyanide concentration in aqueous systems exist, these methods generally require that the cyanide be treated separately. Accordingly, if other contaminants are present in a cyanide-containing solution, a multi-step process is required to remove all the contaminants. The use of separate steps to remove the cyanide and other contaminants increases the cost of the treatment process.

In addition, governmental regulations restrict the amount of organic contaminants that can be present in water. Exemplary organic contaminants include volatile organics, phenolics, oil and grease, and organic contaminants measured in terms of total suspended solids (TSS), biological oxygen demand (BOD), chemical oxygen demand (COD), and total organic carbon (TOC). Unfortunately, compliance with these governmental regulations is not always possible because it is difficult to remove sufficient organic contaminants with prior art organic contaminant removal methods.

SUMMARY OF THE INVENTION

In accordance with the present invention, methods are provided for removing contaminants from an aqueous solution. In one version, the method comprises coprecipitating heavy metal ions with a carrier precipitate which is formed in situ within the aqueous solution. In another version, the method comprises coprecipitating light metal ions with a carrier precipitate which is formed in situ within the aqueous solution. In a third version, the method entails coprecipitating cyanide ions with a carrier precipitate which is formed in situ within the aqueous solution. If a mixture of heavy metal ions, light metal ions, and/or cyanide ions are present in the aqueous solution, these contaminants can be simultaneously coprecipitated using the same methodology.

Use of the above methods results in reducing the presence of heavy metal ions, light metal ions, and cyanide ions in the aqueous solution to below their thermodynamic equilibrium concentrations. This extraordinary result affords the user the unique ability to substantially reduce high aqueous concentrations of heavy and light metals as well as cyanide often to within legally acceptable concentrations, while maintaining the aqueous solution at near neutral pH.

In addition, methods are also provided for removing volatile organics, phenolics, oil and grease, TSS contributors, BOD contributors, COD contributors, and TOC contributors from an aqueous solution. The phenolics, oil and grease, TSS contributors, BOD contributors, and/or TOC contributors present in an aqueous solution are removed by adsorption onto a carrier precipitate which is formed in situ within the aqueous solution. The carrier precipitate preferably is the same precipitate used to remove the heavy metals, the light metals, and/or cyanide.

In each of the above embodiments of the invention, the preferred method involves rapidly forming the precipitate at a controlled pH by quickly oxidizing ferrous ions to form a substantially completely amorphous ferric hydroxide-containing precipitate that also contains a major portion of the non-volatile contaminants originally present in the aqueous solution.

With respect to the volatile organics, these are removed by sparging air through the aqueous solution. In addition, the volatile organic removal process and above discussed precipitation process can be performed simultaneously in the same vessel.

Accordingly, the (a) phenolics, oil and grease, TSS contributors, BOD contributors, and/or TOC contributors, (b) heavy metal ions, light metal ions, and/or cyanide ions, and/or (c) volatile organics can be simultaneously removed from the same aqueous solution in the same reaction vessel.

BRIEF DESCRIPTION OF THE DRAWING

The present invention will be more readily understood by reference to the drawing which schematically illustrates a waste water treatment system embodying features of the invention.

DETAILED DESCRIPTION OF THE INVENTION

The method of the invention can be used to remove the following contaminants from nearly any aqueous stream: dissolved heavy metals, light metals, TSS contributors, BOD contributors, COD contributors, TOC contributors, volatile organics, and/or iron. The invention will now be described first with respect to heavy metals, then light metals and cyanide, next phenolics, oil and grease, TSS contributors, BOD contributors, COD contributors, and TOC contributors, and finally with respect to volatile organics. Unless otherwise stated, all process and apparatus parameters disclosed for heavy metal removal are equally effective for the removal of the other contaminants as well. Likewise, unless otherwise stated, all process and apparatus parameters disclosed for the removal of the other non-volatile contaminants are equally effective for heavy metal removal as well.

With respect to heavy metals, the invention is particularly useful in removing the large concentrations of copper, nickel, zinc, gold, silver, cadmium, tin, chromium, lead, vanadium, mercury, titanium, selenium, antimony, and molybdenum from pickling acid wastes and other acidic waste streams formed in the metal finishing industries. In the method of the invention, an amorphous carrier precipitate is created within an aqueous waste solution which is contaminated with heavy metals and/or iron. The contaminants are thereby caused to coprecipitate with the carrier precipitate and are thus removed from the aqueous solution.

"Coprecipitation" as used with respect to the invention described herein refers to the chemical phenomenon where, within an aqueous solution containing a cationic carrier precipitate precursor, an anionic carrier precipitate precursor, and one or more coprecipitant precursors, the cationic and anionic carrier precipitate precursors are caused to chemically react and precipitate out of the aqueous solution as carrier precipitate particles; and, as the carrier precipitate particles are formed, coprecipitant precursors are removed from the aqueous solution by adsorption onto the surface of the carrier precipitate particle and/or by occlusion within the interior of the carrier precipitate particle. The term "occlusion" as used herein refers to the entrapment of foreign ions within a precipitate particle by physical encapsulation within the particle walls and by chemical bonding within the particle structure.

It has been discovered that by the method of the invention a heavy metal-rich aqueous solution can be transformed into a liquid solid mixture wherein the liquid-phase heavy metal concentrations are substantially lower than their respective equilibrium concentrations. Although the invention is not limited to any particular theory of operation, the reduction of heavy metal concentrations below their equilibrium concentrations is believed to result, in part, from the large quantities of heavy metals which are occluded within the amorphous carrier precipitate structure. The proportion of the dissolved heavy metals which become occluded is typically greater than 10 weight percent, frequently greater than 50 weight percent and often greater than 80 weight percent. By segregating the liquid-phase of the mixture from the amorphous solid-phase, a stable aqueous effluent is produced which is substantially free of heavy metals. It has been further discovered that the method of the invention results in liquid-phase heavy metal concentrations which are so much lower than their respective equilibrium values that environmentally innocuous liquid effluents can be produced from heavy metal concentrated solutions, even when the liquid phases are maintained at near neutral pH.

In the embodiment of the invention illustrated in the drawing, an acid waste stream containing heavy metal ions in concentrations usually above 50 ppmw, typically greater than 100 ppmw, frequently greater than 1,000 ppmw and often greater than 10,000 ppmw is generated in an industrial process 6. This stream is transferred from the industrial process 6 via a conduit 8. Carrier precipitate precursor cations from a source 10 are added to the stream via a conduit 12 to raise the concentration of such cations sufficiently so that the molar ratio of such cations to heavy metal ions within the stream is preferably greater than 1:1, more preferably greater than 4:1, and most preferably greater than 8:1. However, the molar ratio of carrier precipitate precursor cations to heavy metal ions is typically less than about 10:1. In a preferred embodiment of the invention, wherein the carrier precipitate is amorphous oxyferric hydroxide (hereinafter referred to as "ferric hydroxide"), ferrous ions are preferably added as the carrier precipitate precursor cations to achieve the desired molar ratio of ferrous ions to heavy metal ions. However, since waste streams rich in heavy metals are commonly rich in dissolved iron as well, sometimes only little or no addition of ferrous ions from the source 10 is necessary.

Carrier precipitate precursor anions are also added to the waste acid stream. Preferably, such anions are added in sufficient quantities to raise the concentration of such anions within the waste stream to above the stoichiometric concentration necessary to react with all solubilized carrier precipitate precursor cations, and more preferably above 110 percent of such stoichiometric concentration. The addition of such anions can be made by injection into the conduit 8 (not shown) or by addition to vessels 14 and 16 (as described hereinafter). In the embodiment shown in the drawing, addition of the anions is made in two stages to allow for accurate pH control. This two stage pH control is especially preferred for use when ammonia is the selected base and complexable metal cations are present in the waste water. Accordingly, as illustrated in the drawing, the waste acid stream from the industrial process 6 is transferred via the conduit 8 to the mixing vessel 14. The anions are added as part of a base from a source 18 to the acid waste solution within the vessel 14 via a conduit 20. Exemplary bases include aqueous ammonia, hydroxide containing bases (e.g., sodium hydroxide, calcium hydroxide, potassium hydroxide, magnesium hydroxide, etc.), and mixtures thereof.

Rapid mixing of the solution within the vessel 14 is preferably assured by the use of a mixing device 22. Sufficient base is added to the solution within the vessel 14 to raise the solution pH to between about 5.5 and about 6.5. The partially neutralized waste solution is then transferred, via a conduit 24, to the precipitation vessel 16. Via a conduit 26, additional base from the source 18 is added to the waste solution within the vessel 16 in sufficient quantities to raise the solution pH to between about 6.5 and about 9.5, preferably to between about 6.5 and about 9, e.g., about 6.5 to about 8 or about 6.5 to about 7.5, but most preferably to between about 7.5 to about 8.

Within the vessel 16, the carrier precipitate precursor cations are caused to react with the carrier precipitate precursor anions and precipitate out of solution. As the amorphous carrier precipitate forms, substantial quantities of heavy metal ions coprecipitate with the carrier precipitate and are thereby removed from the solution. In the preferred embodiment wherein the carrier precipitate is ferric hydroxide, precipitation is triggered by the oxidation of ferrous ions to ferric ions. Accordingly, as illustrated in the drawing, an oxidizing agent, e.g., air, oxygen, and mixtures thereof, from a source 28, is added to the acid waste stream via a conduit 30. The preferred oxidizing agent is air. Sufficient oxidizing agent is added to rapidly oxidize essentially all of the dissolved ferrous ions to ferric ions. When air is the selected oxidizing agent, the rate of air addition is preferably sufficient to oxidize all of the ferrous ions and to air-saturate the solution.

A dispersion device 32 and/or a mixing device 34 can be used to assure rapid and thorough mixing of the waste solution, additive base, and additive oxidant within the vessel 16. The function of the mixing device 34 is, in part, to shear or otherwise reduce the size of the bubbles that emerge from the dispersion device 32. An exemplary dispersion device 32 is a multi-perforated tube. In general, the cross-sectional area of the multi-perforated tube is selected so that the air flow rate divided by the cross-sectional area is from about 50 to about 150 ft/sec. The remaining dimensions of the multi-perforated pipe are selected in accordance with the rule of thumb for design of perforated-pipe distributors as discussed in Perry's Chemical Engineers' Handbook, Perry et al. Editors, 4th ed., McGraw-Hill Book Company, New York, N.Y. (1963), page 5–45, the publication being incorporated herein by reference.

The coprecipitant reaction is very rapid. Typically, more than 95 weight percent, and usually more than 99 weight percent, of the heavy metals are removed from the waste solution within about 8 minutes after the formation of the first 5 weight percent of the carrier precipitate. After this 8 minute period, the remaining solubilized heavy metals generally continue to be adsorbed onto the precipitate particles. The ideal residence time of the aqueous solution within the vessel 16 and a separator 36 (described hereinafter) varies with each particular operation situation, and the optimizing of such residence time will, in each situation, require some routine adjustment.

From the vessel 16, aqueous effluent, now substantially reduced in dissolved heavy metal content, is transferred together with the nascent precipitate to the solids separator device 36 via a conduit 38. The precipitate is essentially completely amorphous. Within the separator 36 the effluent and amorphous precipitate are segregated into two streams. The separator 36 is comprised of a clarifier, filter, centrifuge, settling pond or other suitable liquid-solid separating equipment capable of segregating the precipitate particles from the aqueous effluent. The segregated precipitate is removed from the separator 36 as a sludge and is transferred to a suitable disposal site (not shown) via a conduit 40.

Although in some embodiments of the invention it is desirable to return a portion of the sludge to either the mixing vessel 14 or the precipitation vessel 16 via a conduit (not shown), in the preferred version of the invention none of the sludge is returned to any portion of the treatment system. In fact, it is most preferred that no water insoluble matter be added to the mixing vessel 14 or the precipitation vessel 16 or any portion of the system feeding into either of these vessels 14 or 16. However, some bases suitable for use in the present invention may be only partially water soluble. These partially water soluble bases can be employed in the most preferred embodiment of the present invention provided that they are substantially devoid of iron-containing, water-insoluble compounds.

The corresponding aqueous effluent, which typically contains less than 15 ppmw heavy metals and usually contains less than 5 ppm heavy metals, can be recycled to the industrial process 6 via a conduit 42. In those cases where it is desired that the recycled effluent be less basic than the solution within the separator 36 (e.g., where the recycled effluent is to be used as an acid makeup solution), acid from a source 44 is added to the recycled effluent via a conduit 46. Optionally, the treated effluent from the separator 36 is discharged to a disposal site (not shown) via a conduit 48. Preferably, the concentrations of heavy metals within the treated effluent are reduced to below the relevant legal limits so that non-recycled effluent can be discharged directly to a municipal sewer.

Although the preceding description of one embodiment of the invention assumes that the aqueous waste solution is an acid waste, the invention is not limited to the treatment of such wastes. Furthermore, although the preceding description of the invention describes a continuous process, the invention can also be practiced as a batch process. In addition, although the carrier precipitate precursor cations (e.g., ferrous ions) have been shown to be originally present in the acid waste stream or added to the acid waste stream via the conduit 8, in an alternative embodiment of the invention the cations are added directly to the precipitation vessel 16 or to any liquid flowing into the precipitation vessel 16. Also, although the pretreatment vessel 14 is shown in the drawing, it is more preferred to introduce the waste stream directly into the precipitation vessel 16 along with the required base, and thus avoid the need for the pretreatment vessel 14. Generally, the pretreatment vessel 14 is used when ammonia is the desired base and the waste water contains complexable metal cations, but even in these situations it is not critical that the two stage pH control be used.

Preferably, the choices of carrier precipitate precursors and operating conditions are made so as to maximize the removal of heavy metal ions while minimizing treatment costs. Towards that end the choices are generally made so as to (1) produce a carrier precipitate structure which is conducive to heavy metal occlusion, (2) produce a carrier precipitate particle surface which is conducive to adsorption, (3) form the carrier precipitate as rapidly as possible, and (4) minimize extraneous reactions which interfere with heavy metal coprecipitation.

The carrier precipitate cation and anion are generally chosen so that, when the carrier precipitate is forming, the developing precipitate is conducive to the occlusion of heavy metals. The carrier precipitate cations of choice are those which have approximately the same ionic diameter as most of the contaminant heavy metals. The similarity of ionic diameter makes it conducive for the forming carrier precipitate to accept heavy metal ions in substitution for carrier precipitate cations. When substituted heavy metal ions are similar in size to the cations, the precipitate structure is not unduly stressed by the heavy metal inclusion. Thus, preferably, the ionic diameter of the carrier precipitate precursor cation is between about 75 percent and about 125 percent of the ionic diameter of the most common heavy metal contaminant within the waste solution.

The preferred carrier precipitate cations are metal ions, with the ions of aluminum, calcium, iron (ferrous), and magnesium being more preferred. Most preferred are iron ions, because such ions closely approximate the size of most contaminant heavy metals and because it is common for large natural concentrations of iron ions to be dissolved within heavy metal-rich waste streams.

The carrier precipitate anions of choice are those which form insoluble salts with the contaminant heavy metals as well as with the carrier precipitate cations. Such anions have a strong attraction for heavy metal ions, and the degree of heavy metal occlusion is directly proportional to the strength of the anion-heavy metal bonds. This proportionality stems from the fact that, before heavy metal occlusion can occur, the heavy metal ions must first be drawn to and strongly held by the anions at the surface of the carrier precipitate. When the carrier precipitate cations are ferrous ions, the preferred carrier precipitate anions are hydroxyl, phosphate, and carbonate ions. When the carrier precipitate cations are calcium ions, the preferred anions are hydroxyl, phosphate, carbonate, and sulfate ions. When the carrier precipitate cations are aluminum, the preferred anions are hydroxyl and phosphate ions. When the primary precipitate cations are magnesium, the preferred anions are hydroxyl, phosphate, and carbonate ions. The preferred carrier precipitates are aluminum hydroxide, ferric hydroxide, calcium sulfate, iron phosphate, and calcium phosphate, with ferric hydroxide being most preferred.

The operating conditions are also generally controlled so as to produce a carrier precipitate particle surface which is conducive to the adsorption of heavy metal ions. As explained above, the carrier precipitate anion is chosen from among those anions which form strong bonds with the contaminant heavy metal ions. In addition, the concentration of carrier precipitate precursor anions in solution is maintained in most cases at levels sufficiently in excess of the concentration of the carrier precipitate precursor cations so as to assure that the carrier precipitate particle surface is anionic. The anionic particle surface attracts the heavy metal ions, binds them (adsorption), and makes them available for incorporation within the precipitate structure (occlusion). When hydroxyl ions are the chosen carrier precipitate anions, maintaining such anion excess is a matter of pH control. Where ferric hydroxide is the chosen carrier precipitate, solution pH during coprecipitation is maintained above about 6 because solutions which are more acidic cause the ferric hydroxide precipitate surface to take on a cationic character.

In general, the larger the carrier precipitate surface area, the more heavy metals are removed from solution. Thus, the carrier precipitate and the conditions of operation are preferably chosen so as to maximize the surface area of each unit mass of precipitate. The total mass quantity of produced carrier precipitate is thereafter controlled, where possible, to the minimum value sufficient to remove the requisite quantity of heavy metals.

The carrier precipitate is generally formed as rapidly as possible because the removal of heavy metal ions by both the adsorption and occlusion mechanisms is markedly greater at higher precipitation rates. Typically, about 95 percent of the carrier precipitate is formed within about 15 minutes, preferably within about 10 minutes, and more preferably within about 5 minutes. The adsorption of heavy metal ions is increased by an increase in the precipitation rate because adsorption is surface area-dependent. When the carrier precipitate is formed rapidly, it forms as a large number of small individual particles, each having a high surface area-to-mass ratio. By relative comparison, when the carrier precipitate is formed slowly, it forms as a small number of large particles, each having a low surface area-to-mass ratio. Thus, for a given mass of carrier precipitate precursors, the faster the precipitate is formed, the larger is the combined surface area of the resulting precipitate particles.

The occlusion of heavy metal ions is increased by an increase in precipitation rates because occlusion is adsorption-dependent and diffusion time-dependent. As alluded to above, heavy metal ions are more likely to be occluded within the carrier precipitate when they are first adsorbed at the carrier precipitate surface. Thus, the number of heavy metal ions occluded within the carrier precipitate is proportional to the number of heavy metal ions adsorbed onto the carrier precipitate surfaces during the growth of the carrier precipitate particles. The number of heavy metal ions which are occluded within the carrier precipitate is inversely proportional to the relative ionic diffusion times available in the vicinity of the forming carrier precipitate. Heavy metal ions, which initially bond with precipitate surface anions and which might otherwise be eventually incorporated as a part of the particle framework, tend to be displaced by competing carrier precipitate precursor cations which diffuse to the precipitate surface. Thus, if the rate of carrier precipitate formation is relatively fast with respect to the rates of ionic diffusion near the forming particle surfaces, the localized diffusion times are relatively small and more heavy metals are occluded.

The choices of carrier precipitate and operating procedures are therefore preferably made, in part, so as to maximize the rate at which the carrier precipitate is formed. In the preferred embodiment wherein the carrier precipitate is ferric hydroxide, the precipitation rate depends on two reactions, the oxidation of ferrous ions to ferric ions and the reaction of ferric ions with hydroxyl ions. The precipitation rate is almost solely controlled by the oxidation reaction since oxidation is much the slower of the two reactions. Thus, the basic strategy is to maximize the rate of oxidation. Accordingly, in the case of ferrous ions, substantially all the ferrous ions in the solution are oxidized to ferric ions within about 30 minutes. Preferably, the oxidation time is less than 15 minutes, and more preferably less than 10 minutes. In order to obtain this oxidation rate, the oxidant is rapidly introduced into the aqueous solution. Since the more oxidant introduced into the solution, the faster the oxidation rate, the amount of oxidant, when air, introduced into the solution is typically at least about 1 liter of air, preferably at least about 2 liters of air, more preferably at least about 4 liters of air, and even more preferably at least about 10 liters of air per 1000 ppm ferrous iron initially present in the solution before the introduction of oxidant when operating on a batch basis. However, when operating on a continuous basis, the above amounts of air are per 1000 ppm ferrous present, on an average, in the feed stream to the reactor. In rate terms, when the oxidant is air, the air is generally introduced into the solution at a rate of at least about 10, more typically about 50, preferably about 90, and even more preferably about 200 liters of air per hour per liter of solution per 1000 ppm ferrous iron (1/hr/1/1000 ppm ferrous iron) present in the solution at the beginning or substantially at the beginning of the residence time of the solution in the precipitation vessel 16 when operating on a batch basis. However, when operating on a continuous basis, the rate of air introduction is per 1000 ppm ferrous iron present, on an average, in the feed stream entering the precipitation vessel 16.

The oxidation reaction is also accelerated as the solution pH is raised. Accordingly, it is preferred to maintain the pH of the reaction medium as high as possible during the introduction of the oxidizing agent.

In addition, the oxidation reaction is accelerated by the presence of a suitable catalyst. Most soft Lewis bases can be employed as suitable catalysts, with iodine and oxygen-containing soft Lewis bases being preferred. The most preferred catalyst is ferric hydroxide since it is manufactured in situ by the method of the invention. However, no addition of catalyst is usually necessary because ferric hydroxide is formed in situ and is thereafter constantly present within the precipitation vessel 16.

In addition to promoting rapid precipitation, the rapid oxidation of the ferrous ions may promote occlusion in another way. In aqueous solutions, ferrous ions tend to form soluble complexes with heavy metal and hydroxyl ions. If the ferrous ions of such complexes are rapidly oxidized to ferric ions, these complexes tend to precipitate out of solution en masse, including the originally complexed heavy metal ions which, during precipitation, become occluded within the precipitate.

The operating conditions are also preferably controlled to minimize extraneous reactions which interfere with the heavy metal coprecipitation. Thus, the concentration of superfluous ions is maintained as low as practical (for instance, by dilution of the waste stream) since such ions interact with carrier precipitate precursor and heavy metal ions, thereby impeding the coprecipitation reactions. Also, the pH of the aqueous solution is maintained at sufficiently low levels to minimize the effects of complexing agents which solubilize heavy metal ions at high pH. For instance, certain nitrogenous compounds, including ammonia, complex with several heavy metal ions, especially with copper, nickel, and zinc, at pH levels above about 8. Where such complexing agents are present in the aqueous solution and where "complexable" heavy metal ions are also present, the pH of the aqueous solution is therefore maintained below about 8, and preferably below about 7.5. Accordingly, in the embodiment of the invention illustrated in the drawing (wherein aqueous ammonia is used as a base), the pH of the waste solution in the precipitation vessel 16 is preferably maintained between about 6.5 and about 7.5 in order to oxidize the ferrous ions as rapidly as possible but not form significant quantities of ammonia-heavy metal complexes. Since this pH operating range is relatively narrow, since the relation between dissolved ammonia and solution pH is very sensitive within this operating range, and since the pH of the acid waste stream generated in the industrial process 6 can fluctuate significantly, it is sometimes preferable as shown in the drawing to accomplish pH control in two steps. First, the pH of the acid waste stream is raised to pH levels between about 5.5 and about 6.5 within the vessel 14. Second, the solution pH is carefully raised to operating levels (e.g., between about 6.5 and about 7.5, but most preferably between about 7.5 and about 8) within the precipitation vessel 16. However, if possible, it is generally preferred to add the waste stream directly to the precipitation vessel 16 and adjust the pH of the waste stream only within the precipitation vessel 16, i.e., to avoid two step pH control.

Accordingly, the aqueous waste solution is preferably introduced into the precipitation vessel 16 while maintaining the vessel 16 under conditions which substantially and immediately subject essentially all of the ferrous ions entering the vessel 16 to oxidizing conditions causing rapid oxidation of the ferrous ions while preferably controlling the pH so a to coprecipitate a substantially completely amorphous precipitate comprising a substantial amount of ferric hydroxide coprecipitated with a substantial proportion of the heavy metals.

The method of the invention is unique in its effectiveness for removing substantial quantities of heavy metals from aqueous solutions at near neutral pH. The effective removal of heavy metals at near neutral pH is most advantageous to the industrial operator. It substantially reduces problems caused by the aforementioned presence of heavy metal complexing agents, especially nitrogenous complexing agents, which are commonly found in aqueous waste streams. Accordingly, it allows the additive use of aqueous ammonia, a most cost-effective base. The ability to operate at near neutral pH also eliminates the need to add neutralizing acid to the treated effluent before disposal. Likewise, it markedly reduces the consumption of fresh acid necessary to reacidify the treated effluent when the effluent is employed as a recycle acid. Finally, operating at near neutral pH produces a precipitate which settles faster than precipitates formed at higher pH levels. This last fact allows the operator to separate the treated effluent from the nascent precipitate particles with smaller and less expensive separating equipment than would be required by other precipitation methods.

The preferred embodiment of the invention employing ferric hydroxide as the carrier precipitate has the additional unique advantage over conventional hydroxide precipitation methods of requiring less additive base to precipitate a given quantity of iron and contaminant heavy metals. In conventional alkali-precipitation methods, base is consumed in the precipitation of individual iron ions, and additional base is consumed in the precipitation of individual heavy metal ions. In the embodiment of the invention illustrated in the drawing, base is consumed in the precipitation of individual ferric ions, but little additional base is required to precipitate the heavy metal ions. Furthermore, in this preferred embodiment of the invention, a substantial proportion of the base required by the process is manufactured by the process itself. For every ferrous ion that is oxidized to a ferric ion, a hydroxyl ion is produced pursuant to the following reaction:

$$2Fe^{+2} + 1/2O_2 + H_2O \rightarrow 2Fe^{+3} + 2OH^-$$

The method of the invention is also advantageous in that chromium ions can be removed from an aqueous waste solution without having to first reduce the hexavalent chromium ions to trivalent ions. Typically, in a preferred embodiment of the invention, more than about 95 percent, and preferably more than 99 percent, of the hexavalent chromium is removed from the aqueous waste solution at the same time and by the same method as are other heavy metals. Thus, the method of the invention eliminates the need for segregating and separately treating hexavalent chromium containing waste streams, and saves the costs of acid, base, and reducing agent required by such treatment.

The method of the invention is further advantageous in that several heavy metals in the waste solution—and oftentimes each and all of the heavy metals—can be removed by at least about 95%, sometimes at least by about 99%, with iron also being removed by at least about 95% and oftentimes by virtually 100%. The examples hereafter show how readily the invention removes two, three, and four heavy metals simultaneously by more than about 95%, with three examples (i.e., Examples 1, 4, and 10) showing the removal of five such heavy metals, with a concomitant reduction in the iron by about 100%. In addition, the data in Examples 6 to 10 establish that, under the preferred operating conditions, each of the heavy metals (and iron) can be reduced to a concentration less than about 1 ppmw—even when the initial concentrations total more than about 400 ppmw. In addition, the present invention is capable of reducing the concentration of the heavy metals in the treated waste water to below their thermodynamic equilibrium levels. Typically, at least one heavy metal is reduced to below its thermodynamic equilibrium concentration level. Preferably, the concentrations of a plurality, e.g., at least 3 or 4, and most preferably all, of the heavy metals are reduced to below their thermodynamic levels.

In one version of the present invention, to further reduce the concentration of contaminants in the effluent from a first treatment process embodying features of the present invention, the effluent is subjected to a second treatment process in accordance with the method of the present invention. In other words, although in the vast majority of cases only a single operating stage with a single precipitation reactor vessel 16 will be needed, one may operate serially with a plurality of stages, each treating the effluent of the preceding stage.

Finally, the method of the invention is superior to conventional precipitation methods in that it produces less precipitate sludge. The lower sludge production stems, in part, from the fact that the volume of sludge is smaller when several metals are coprecipitated than when those metals are precipitated separately. The difference in sludge-production is even greater when the method of the invention and conventional precipitation methods are compared in the treatment of aqueous solutions containing significant quantities of heavy metal complexing agents. As stated above, the conventional treatment of such aqueous solutions requires the use of large quantities of calcium hydroxide and results in the formation of sludge volumes which are even larger than normal.

The invention can be further understood by considering the following specific examples which are illustrative of specific modes of practicing the invention and are not intended as limiting the scope of the appended claims.

EXAMPLE 1

Two aqueous waste solution samples were obtained from a commercial electroplating process. The first sample was taken from a 10,800 gal/day waste water stream containing approximately 0.6 weight percent total dissolved solids. The second sample was taken from a 1,400 gal/day waste acid stream containing approximately 15 weight percent total dissolved solids.

Twenty-three milliliters of the waste acid sample was mixed in a mechanically agitated beaker with 177 ml of the waste water sample to yield 200 ml of a combined waste solution sample. Immediately thereafter, 4.5 ml of a 28 weight percent aqueous ammonia solution was rapidly added to the beaker. Thereupon, 25 ml of an aqueous solution containing approximately 4 weight percent of a ferric hydroxide-heavy metal precipitate was added to the beaker.

Immediately thereafter, air was commenced to flow through a sintered glass tube at the bottom of the beaker so as to cause air bubbles to rise through the solution. A precipitate was observed to appear within the solution, and the solution pH was observed to begin dropping. Aqueous ammonia wa periodically added to the solution over about the next 30 minutes in order to maintain the solution pH between about 7.0 and about 7.5.

After about 30 minutes, the solution pH was observed to stabilize. The flow of air was ceased but the solution was agitated for an additional 30 minutes.

Thereafter, a pipette was used to extract a sample of the solution-precipitate mixture. The precipitate particles were removed by filtering the sample through #41 (coarse) filter paper. The resulting filtrate was clear and colorless.

The filtrate was analyzed for heavy metals content and compared to the heavy metal content of the original combined waste solution sample. The results are presented in TABLE 1.

TABLE 1

| Sample | Metals Concentrations, ppmw | | | | | | | Solution |
| --- | --- | --- | --- | --- | --- | --- | --- | --- |
| | Cd | Cr | Cu | Fe | Ni | Pb | Zn | pH |
| Untreated combined waste solution | 0.6 | 2.3 | 5 | 4,850 | 3.5 | 106 | 953 | 3.5 |
| Treated filtrate after treatment | <0.1 | <0.1 | 1.4 | <0.1 | 0.2 | <0.5 | 2.8 | 7.3 |
| Percent Removal | >98.3 | >95.7 | 72.0 | 100 | 94.3 | >99.5 | 99.7 | NA[1] |

[1] NA denotes not applicable.

EXAMPLE 2

A 50 ml sulfuric acid waste sample from a commercial electroplating process was diluted with distilled water to 200 ml. The waste solution was neutralized by the addition of 17.5 ml of a 28 weight percent aqueous ammonia solution, whereby the solution pH was observed to be 7.7.

The slurry was added to a mechanically agitated beaker containing 22 ml of an aqueous ferric hydroxide slurry. Air was commenced to flow through a sintered glass tube at the bottom of the beaker so as to cause air bubbles to rise through the solution. Aqueous ammonia was periodically added to the solution so as to maintain the solution pH between 7.0 and 7.5.

About 15 minutes after neutralization, the pH of the solution was stabilized to about 7.35 and a precipitate was observed within the solution. Air dispersion was terminated but mechanical agitation was continued. A sample of the solution-precipitate mixture was extracted with a pipette and filtered through coarse filter paper. About 25 minutes after neutralization, a second sample was similarly extracted and filtered. The filtrates from both samples were clear and colorless.

The filtrates from both samples were analyzed for heavy metals content. A comparison of the heavy metals content of the filtrates to the heavy metals content of the original acid waste sample is summarized in TABLE 2.

TABLE 2

| Sample | Metals Concentrations, ppmw | | | | | | SO4 Conc. ppmw | Solution pH |
| --- | --- | --- | --- | --- | --- | --- | --- | --- |
| | Cd | Cr | Cu | Fe | Ni | Zn | | |
| Untreated acid waste | 0.75 | 8.75 | 2.0 | 3,625 | 8.5 | 132 | 66,250 | N.T.[1] |
| Treated filtrate 15 min. after neutralization | <.01 | <.01 | 0.2 | <.01 | 1.7 | 2.1 | N.T. | 7.35 |
| Percent Removal After 15 min. | >98.7 | >99.9 | 90.0 | 100 | 80.0 | 98.4 | NA | NA |
| Treated filtrate 25 min. after neutralization | <.01 | <.01 | 0.2 | <.01 | 1.7 | 2.1 | N.T. | 7.35 |

[1] N.T. denotes that the parameter was not tested.

EXAMPLE 3

A 200 ml volume of a heavy metals-containing acid solution was prepared. The solution was placed in a mechanically agitated beaker and neutralized to a pH between about 7.0 and about 7.5. Immediately thereafter, 0.142 gr of ferric oxide was added to the solution and air was commenced to bubble through the solution. Additional base was periodically added to maintain the solution pH between 7.0 and 7.5. About 7 minutes after neutralization, the solution pH was observed to have stabilized and precipitate particles were visible within the solution. A sample of the solution-precipitate mixture was extracted and filtered with coarse filter paper. The filtrate, which was clear and colorless, was analyzed for heavy metals content.

The solution-precipitate mixture was agitated for an additional 15 minutes (a total of 22 minutes after neutralization) without addition of base or air. A second sample was extracted and filtered through coarse filter paper. The filtrate, which was clear and colorless, was analyzed for heavy metals content.

The solution-precipitate mixture was agitated for an additional 7.5 hours (a total of 18 hours after neutralization). A third sample was extracted and filtered, and the clear, colorless filtrate was analyzed for heavy metals content.

A comparison of the results of the filtrate heavy metals analyses to the heavy metals content of the original acid solution is set forth in TABLE 3.

TABLE 3

| Sample | Metals Concentrations, ppmw | | | | | | Solution pH |
|---|---|---|---|---|---|---|---|
| | Cd | Cr | Cu | Fe | Ni | Zn | |
| Untreated acid solution | 102 | 74 | 96 | 5,684 | 96 | 101 | N.T. |
| Treated filtrate 7 min. | 4 | <.01 | 0.2 | <.01 | 3.4 | <0.1 | 7.5 |
| Treated filtrate 22 min. after neutralization | 7 | <.01 | 0.09 | <.01 | 7.3 | 0.6 | 7.5 |

TABLE 3-continued

| Sample | Metals Concentrations, ppmw | | | | | | Solution pH |
|---|---|---|---|---|---|---|---|
| | Cd | Cr | Cu | Fe | Ni | Zn | |
| Percent Removal After 22 min. | 93.1 | >99.9 | 99.9 | 100 | 92.4 | 99.4 | NA |
| Treated filtrate 18 hr. after neutralization | 9.3 | <.01 | 0.09 | <.01 | 6.7 | 0.8 | 6.9 |

EXAMPLE 4

A sample of an acid waste solution from a commercial galvanizing process was placed in a mechanically agitated beaker, neutralized with aqueous ammonia, and oxidized with bubbled air while maintaining the solution pH between about 7.0 and about 8.2. When the solution pH stabilized, addition of aqueous ammonia and air was discontinued except as noted below.

A solution-precipitate sample was extracted with a pipette 7 minutes after neutralization. The sample was filtered and analyzed for heavy metals. A second sample was also extracted (60 minutes after neutralization), filtered and analyzed for heavy metals. Additional aqueous ammonia was thereupon added to the solution and a third sample was extracted (73 minutes after neutralization). This sample was also filtered and analyzed for heavy metals.

Two additional samples were similarly extracted, filtered and analyzed for heavy metals. The results of all analyses are summarized in TABLE 4.

TABLE 4

| Sample | Metals Concentrations, ppmw | | | | | | | Solution pH |
|---|---|---|---|---|---|---|---|---|
| | Cd | Cr | Cu | Fe | Ni | Pb | Zn | |
| Untreated acid waste | 6.25 | 256 | 72 | 54,400 | 206 | 5,125 | 354 | N.T. |
| Treated filtrate 60 min. after neutralization | <.01 | <0.01 | 5.6 | 1.3 | 6.6 | <0.5 | 1.2 | 7.0 |
| Percent removal 60 min. after neutralization | >99.8 | 100 | 92.2 | 100 | 96.8 | 100 | 99.7 | NA |
| Treated filtrate after base added, 73 minutes after neutralization | <.01 | <0.01 | 7.2 | <0.01 | 3.2 | <0.5 | 0.6 | 7.8 |
| Treated filtrate 120 min. after neutralization | <.01 | <0.01 | 5.4 | <0.01 | 1.5 | 0.6 | 0.6 | 7.6 |
| Treated filtrate 2 mos. after neutralization | 0.2 | <0.01 | 0.9 | 0.4 | 0.5 | <2.5 | <0.4 | N.T. |

EXAMPLE 5

A 50 ml acid waste sample from a commercial electroplating process was added to a mechanically agitated beaker and diluted with distilled water to 200 ml. To this diluted solution was added 18 ml of a 28 weight percent aqueous ammonia solution, whereby the solution pH was observed to be 7.0. An additional 10 weight percent iron was added to the solution in the form of ferric hydroxide particles. Immediately thereafter, air was bubbled through the solution. Aqueous ammonia was periodically added to maintain the solution pH between 7.0 and 7.5.

After about 8 minutes, the solution pH was observed to have stabilized. A sample was extracted with a pipette, filtered, and analyzed for heavy metals.

Air dispersion was halted but solution agitation was continued. The pH of the solution was raised to about 9.0. A second sample was immediately extracted, filtered, and analyzed for heavy metals.

The solution was agitated for an additional 60 minutes during which time aqueous ammonia was periodically added to maintain the pH at about 9.0. A third sample was extracted, filtered, and analyzed for heavy metals.

The results ar summarized in TABLE 5.

TABLE 5

| Sample | Metals Concentrations, ppmw | | | | | | | Solution pH |
|---|---|---|---|---|---|---|---|---|
| | Cd | Cr | Cu | Fe | Ni | Pb | Zn | |
| Untreated waste acid | 0.75 | 8.75 | 2 | 3,625 | 8.5 | 132 | 132 | N.T. |
| 8 min. after neutralization | 0.04 | <0.01 | 0.2 | 0.3 | 0.7 | <0.05 | 2.4 | 7.0 |
| 10 minutes after neutralization | 0.1 | <0.01 | 1.6 | 0.3 | 3.3 | 0.05 | 30 | 9.0 |
| Percent removal 10 min. after neutralization | 86.7 | >99.9 | 20.0 | 100 | 61.2 | 100 | 77.3 | NA |
| 70 min. after neutralization | 0.1 | <0.01 | 1.6 | 0.3 | 2.6 | <0.05 | 30 | 9.0 |

EXAMPLE 6

The ferrous ion concentration of an acidic waste water solution (having a composition shown in Table 6, below) was increased to 852 ppm by addition of a concentrated ferrous chloride solution, yielding a mass ratio of 3.2 ferrous ion to heavy metal. The pH of the waste water solution was then raised to 7.8 using a solution of sodium hydroxide as base. A portion (480 ml) of the resultant solution was charged to a laboratory reactor vessel, air was sparged in at the rate of 6 liters per minute, and sodium hydroxide solution was added as necessary to maintain the pH at 7.8. The solution was kept under conditions of high agitation during the oxidation-precipitation reactions, and there was no addition of any solid matter to the solution. The oxidation precipitation reactions were allowed to proceed for 15 minutes, after which a sample of product solution was analyzed. The results of the analysis are also set forth in the following Table 6:

TABLE 6

| | Waste Water | Product Solution | Percent Removal, % |
|---|---|---|---|
| Cr, ppm | 214 | 0.03 | >99.9 |
| Cu, ppm | 1.5 | <0.01 | >99.3 |
| Ni, ppm | 46 | 0.2 | 99.6 |
| Mn, ppm | 6.3 | 0.2 | 96.8 |
| Fe+2, ppm | 217 | 0.03 | >99.9 |
| Total Heavy Metal, ppm | 484.8 | <0.47 | >99.9 |

The data in Table 6 show that the present invention removes an assortment of heavy metals to extremely low levels.

EXAMPLE 7

An aqueous waste solution having a pH of 1.0 contained the following metals in the concentrations shown:

| Calcium | 375 ppm | Lead | 189 ppm |
|---|---|---|---|
| Chromium | 0.6 ppm | Zinc | 19 ppm |
| Copper | 2.3 ppm | Iron | 1.370 ppm |

Upon chemical analysis it was found that 83% of the iron existed in the solution as ferrous ion.

Sixty gallons of the waste solution were introduced into a tank, and while air was introduced by a sparger and the efficiency of the air oxidation increased by mechanical dispersion (i.e., a mixer outfitted with a high shear turbine), the pH of the solution was increased to 7.5 and maintained at that level by addition of ammonia. Within 7 minutes, it was apparent by visual inspection that a red precipitate had formed and the reaction was essentially complete. In addition, the pH held constant after 7 minutes (i.e., little or no additive base was required to maintain the pH at 7.5), also indicating that the reaction was complete Nevertheless, the oxidation and agitation were maintained for another 223 minutes, the temperature of the solution being about 75 F. throughout. At the end of the 223 minutes, the precipitate still appeared visually the same as after the first 7 minutes. A sample of this precipitate at the end of the run was recovered, frozen in liquid nitrogen to prevent any altering of its character, freeze-dried under low pressure, and then analyzed by X-ray diffraction analysis. The sample evidenced no sign of crystallinity and, therefore, was determined to be completely amorphous. Also, the sample did not respond to the presence of a magnet.

The above Example 7 demonstrates, inter alia, that the precipitate formed in the process of the present invention is completely amorphous and not an intermediary to the production of a crystalline precipitate.

EXAMPLE 8

Sixty gallons of the aqueous solution described in Example 7 were introduced into the reactor vessel employed in Example 7, but the temperature in the reactor vessel was maintained at about 100° F. (38° C ). Oxidation with air sparging and dispersion was as described in Example 7, and the pH was initially controlled to a value of around 7.75 by addition of ammonia. The reaction was essentially complete within about 11 minutes. (This was proven by the fact that a sample of the solution was taken, filtered, and the resulting filtrate was clear, remained clear for one hour with no change in pH, and contained only 0.2 ppm copper, less than 0.3 ppm lead, less than 0.5 ppm iron, and 0.3 ppm zinc. Also, the pH was stable within 11 minutes, requiring no further base addition). Four minutes later, continuous operation began, with the feed into and out of the reactor vessel of the aqueous solution being 1 gpm, so that the residence time therein was 60 minutes pH was maintained at about 7.5. Two samples of the contents of the reactor vessel were taken after 70 and 75 minutes of continuous operation, freeze-dried as in Example 7 and analyzed by X-ray diffraction analysis. Both samples showed no evidence whatever of crystallinity. Again, the samples were completely amorphous. Further evidence of this was that inspection by high resolution microscopy showed no discernible discrete particles of regular shape and size.

The above Example 8 demonstrates, inter alia, that the precipitate formed when conducting the process of the present invention at about 100. F. is completely amorphous and not an intermediary to the production of a crystalline precipitate. In addition, the method of the invention is useful for removing at least about 91.3 weight percent copper, at least about 99.8 weight percent lead, at least about 99.9 weight percent iron, and at least about 98.4 weight percent zinc.

EXAMPLE 9

Again, 60 gallons of the aqueous solution described in Example 7 were introduced into the reactor vessel used in Examples 7 and 8, but this time the temperature was maintained at 150° F. (66° C.). With air sparging, mechanical dispersion, and ammonia addition as in Examples 7 and 8, the reaction appeared complete about 20 minutes after the pH was adjusted to 7.5, i.e., after 20 minutes little or no base was needed to maintain pH, thereby indicating that the oxidation reaction was over. Nevertheless, oxidation by sparging and mechanical dispersion was continued for one hour, at which time a sample of the contents of the vessel was taken, filtered, and the precipitate freeze-dried and analyzed by X-ray diffraction while the filtrate was analyzed for metals. Again, the precipitate was found to be noncrystalline and completely amorphous. The filtrate was found to contain only trace concentrations of metals, i.e., 0.3 ppm copper, less than 0.05 ppm lead, 0.01 ppm iron, 0.6 ppm zinc, and less than 0.01 ppm chromium.

Example 9 therefore demonstrates, inter alia, that even when run at about 150° F., the process of the instant invention yields a completely amorphous precipitate and does not form an intermediary to the production of a crystalline precipitate. In addition, at least about 87.0 weight percent copper, at least about 99.9 weight percent lead, at least about 99.9 weight percent iron, at least about 96.8 weight percent zinc, and at least about 98.3 weight percent chromium can be removed from a contaminated waste solution.

EXAMPLE 10

One liter of an untreated waste water having the metals content shown in Table 7 was introduced into a laboratory-size reactor vessel. It was allowed to come to room temperature. Air sparging through the bottom of the vessel at a rate of 493 l/hr/l with mechanical dispersion, i.e., a laboratory mixer, was then commenced. The air was sparged through a fritted disk to produce small bubbles. The pH was then raised to 7.5 and held at that value by periodic addition of caustic soda, as necessary, producing a brick red precipitate.

Samples of the solution containing the precipitate were taken at 10, 15, 30, and 45 minutes after the base was first added. The four samples of solution containing the precipitate were then filtered through a Whatman #41 brand filter paper, and two samples of each filtrate were taken, so that a total of eight samples were obtained. To one set of the four samples, hydrogen peroxide was added to detect the presence of ferrous ion. No precipitate formed in any of the samples, thus proving that at the 10-, 15-, 30-, and 45-minute intervals all the ferrous ions had oxidized.

The second set of samples was allowed to stand exposed to the air for 1 hour in vials, after which they were capped. The second set of samples were acidified and analyzed for metals content. The data so obtained are shown in Table 7. Not only was iron removed in this Example 10 to extremely low levels but also all the other heavy metals. There were virtually no heavy metals left in the aqueous filtrate, and the metals data in Table 7 are all essentially below or close to their analytical detection limits.

Also, the four samples of the precipitate obtained on the Whatman #41 filter paper were subjected to X-ray diffraction analysis and found to contain no crystalline materials, i.e., they were completely amorphous.

TABLE 7

| Metal | Metal Concentration In Ppmw After A Total Elapsed Oxidation Time (Min.) of | | | | | Percent Removal After 45 Min. |
|---|---|---|---|---|---|---|
| | 0[1] | 10 | 15 | 30 | 45 | |
| Cd | 0.29 | 0.03 | 0.03 | 0.03 | 0.03 | 89.7 |
| Cr | 1.22 | 0.005 | <0.004 | <0.004 | <0.004 | >99.7 |
| Cu | 7.65 | 0.07 | 0.05 | 0.03 | 0.02 | 99.7 |
| Fe | 5.310 | 0.03 | 0.02 | 0.02 | 0.02 | 100 |
| Pb | 430 | 0.11 | 0.006 | 0.005 | 0.006 | 100 |
| Ni | 2.11 | 0.04 | 0.04 | 0.04 | 0.03 | 98.6 |
| Zn | 570 | 0.56 | 0.56 | 0.7 | 0.59 | 99.9 |
| pH[2] | — | 7.5 | 7.5 | 7.5 | 7.5 | NA |

[1] Analysis of untreated waste water solution.
[2] pH of reactor contents when sample taken.

EXAMPLE 11

In this experiment, Example 10 was continued under the same oxidizing conditions, but at a temperature of 60° C. for another 3 hours (i.e., a total oxidizing time of 3 hours and 45 minutes, the first 45 minutes at room temperature and the last 3 hours at 60° C.). The brick-red precipitate remained intact and, as evidenced by no significant changes in pH and oxidation-reduction potential, there was no evidence of further reaction. In addition, X-ray analysis of the precipitate at the end of the 3 hours of high temperature oxidation showed that the precipitate was still completely amorphous.

Again, as with Examples 7–9, the data of Examples 10 and 11 show that the precipitate formed in the process of the present invention is completely amorphous and not an intermediate to the formation of a crystalline, magnetic precipitate.

EXAMPLE 12

In this experiment, another 1 liter of the untreated waste water of Example 10 was introduced into the same laboratory reactor vessel employed in Example 10 and allowed to come to room temperature. Caustic soda was added and the pH was adjusted to 7.5. The contents of the solution were allowed to stand and form a ferrous hydroxide suspension.

After forming the ferrous hydroxide suspension, the reaction conditions were altered to subject the contents of the vessel to the method of the invention. Specifically, air was sparged into the reactor vessel at a rate of 493 l/hr/l and the pH was maintained at about 7.5 so as to induce rapid and complete oxidation of ferrous ions. The ferrous hydroxide suspension was rapidly converted to the brick-red amorphous precipitate described in Example 11.

Example 12 demonstrates that rapid oxidation is essential to forming the amorphous precipitate desired in the process of the instant invention.

EXAMPLE 13

A commercial facility treats acidic waste water containing iron, lead, and zinc contaminants by bringing the pH up to 8.0 with lime followed by natural aeration in a large settling pond. The same waste was treated, on a laboratory scale, by a process within the scope of the present invention wherein the waste solution was subjected to rapid oxidation with an air stream while the pH was controlled at about 8.0 with lime. Both processes produced a sludge comprising ferric hydroxide.

Various comparisons were then made:

(1) Settleability. The rate at which a precipitate settles can affect the time a sludge needs to be held in a settling zone before a purified liquid can be recovered. A precipitate from the conventional process was blended with deionized water so as to have a total solids content of 770 ppm—equal to that of a sample of precipitate (obtained by the process of the present invention) in water. The samples were put into 100 ml graduated cylinders and 3 ppm of a standard flocculating agent (Nalco 7173 brand polyelectrolyte) was added to each cylinder. Each cylinder was then capped and simultaneously (a) inverted 5 times and then simultaneously (b) placed on a bench top. The settling rate for precipitate obtained via the process of the present invention was about eight times faster than for the conventional precipitate.

(2) Compaction Volume. Compaction volume of a waste water treatment sludge is of special importance in reducing the cost of landfilling, e.g., the less volume, the less a disposal problem. Two samples of (a) the precipitate from the conventional process and (b) the precipitate of the process of the present invention were put into four different 25 ml graduated cylinders and brought to equal total solids levels. One sample of each precipitate was then combined with 3 ppm Nalco 7173 brand polyelectrolyte. Next, all four samples while capped were simultaneously (a) inverted 3 times, (b) then put on a bench top, and (c) allowed to sit for 3 weeks. The precipitate from the exemplary process of the present invention occupied $\frac{1}{8}$ the volume of the conventionally produced precipitate containing an approximately equal amount of iron.

(3) Dewaterability. The less water a precipitate takes up, i.e., the less gelatinous it is, the easier it is to filter through conventional filter presses. In the conventional process described above, the final "dewatered" product contains 75 to 85% water whereas sludges produced from the exemplary process of the present invention typically run between 55 and 65% water. The difference between such values is that the conventional process requires high pressures and long filtration times and the precipitate tends to bind to the filter cloths and proves difficult to remove. In contrast, precipitates from the exemplary process of the present invention come away cleanly from the filter cloths. In addition, lower pressures and less time are required for filtration.

Example 13 accordingly demonstrates the improved settleability, compaction volume, and dewaterability characteristics of the precipitate formed by the process of the instant invention.

In addition to removing heavy metals, the process of the present invention is also useful for reducing the concentration of light metals (i.e., metals that are not heavy metals), especially aluminum and beryllium, as well as cyanide, phenolics, oil and grease, TSS contributors, BOD contributors, COD contributors, and TOC contributors present in the aqueous solution. Furthermore, any combination of these contaminants as well as any combination of these contaminants and heavy metals can be removed simultaneously from a solution in the same vessel. The process steps as well as the pH, oxidation rate, and reduction in individual contaminant concentration levels are substantially the same as discussed above with respect to heavy metals. In addition, the molar ratio of ferrous ions to light metal ions and/or cyanide ions is the same ratio as discussed above with respect to the molar ratio of ferrous ions to heavy metal ions.

However, with respect to contaminants selected from the group consisting of phenolics, oil and grease, TSS contributors, BOD contributors, COD contributors, and TOC contributors, the amount of ferrous ions employed to remove these contaminants from a solution is best expressed in terms of weight ratio, as opposed to molar ratio used above. Generally, the weight ratio of the ferrous ions to the total amount of contributors from this group of contaminants is at least about 1:1, but typically less than about 10:1, and preferably about 4:1 to about 6:1. When contaminants selected from a first group consisting of light metals, cyanide, and/or heavy metals and contaminants selected from a second group consisting of phenolics, oil and grease, TSS contributors, BOD contributors, COD contributors, and TOC contributors are both present in the solution, the ferrous ion concentration generally is equal to at least the sum of (A) the molar concentration of the contaminants selected from the first group plus (B) the weight of the contaminants selected from the second group. Typically, the ferrous ion concentration of the solution is equal to less than about ten times that sum. Preferably, the ferrous ions are present in the solution in a concentration that is about 2 to about 8, and more preferably about 4 to about 6, times the above sum.

As in the case of heavy metals, the method of the invention is also advantageous in typically removing at least about 95 percent, and preferably at least about 99 percent, of each these other contaminants present in the waste solution. For example, a waste stream containing at least about 0.1 ppmw, or even about 1 ppmw, or even over about 10 ppmw aluminum, when treated by the process of the present invention can have its aluminum content reduced below about 0.05 ppmw. In fact, the process of the instant invention can reduce the concentration of contaminants in a waste stream to the following levels:

| Contaminant | Level, ppmw | | |
|---|---|---|---|
| | Typical | Preferred | More Preferred |
| Ag | <0.05 | <0.01 | <0.005 |
| Al | <0.06 | <0.04 | <0.02 |
| As | <0.02 | <0.01 | <0.005 |
| Cd | <0.02 | <0.01 | <0.005 |
| Cr | <0.01 | <0.004 | <0.002 |
| Cu | <0.02 | <0.01 | <0.005 |
| Fe | <0.02 | <0.01 | <0.005 |
| Pb | <0.01 | <0.005 | <0.003 |
| Ni | <0.1 | <0.01 | <0.005 |
| Sb | <0.5 | <0.2 | <0.1 |
| Se | <0.05 | <0.01 | <0.005 |
| Sn | <0.5 | <0.05 | <0.03 |
| V | <0.004 | <0.002 | <0.001 |
| Zn | <0.02 | <0.005 | <0.003 |
| Total Heavy and Light Metals | <1.5 | <0.8 | <0.5 |
| TSS | <6 | <4 | <2 |
| TDS | <600 | <400 | <200 |
| Cyanide | <0.04 | <0.02 | <0.01 |
| BOD | <40 | <3 | <1.5 |
| COD | <250 | <50 | <25 |
| TOC | <70 | <20 | <10 |
| Oil & Grease | <0.1 | <0.05 | <0.03 |
| Phenolics | <1 | <0.01 | <0.005 |

The following Examples 14 and 15 are illustrative of some of the above additional embodiments of the invention, as well as showing the effectiveness of the invention for removing the heavy metal selenium.

EXAMPLE 14

Influent and effluent waste water samples from a biotreatment plant were collected in clean, 1-gallon amber glass bottles with teflon-lined lids. At the collection points, the bottles were first flushed with the waste water to be taken, then filled to the top with a sample to eliminate air space. The bottles were then sealed and refrigerated at about 4° C. for preservation. Within a few hours, the refrigerated samples were packaged in ice chests with chilled blue ice packs wrapped around each bottle. The samples arrived at the laboratory within 24 hours after collection. On arrival, the samples were tested for pH, temperature, oxidation-reduction potential (ORP), and dissolved oxygen. The bottles were resealed and the samples were stored in the dark at about 4° C. until further testing. All screening tests were conducted within 4 days of sample receipt.

Waste Water Characterization

The samples of the waste water were characterized for heavy metals, oil and grease, inorganic and organic compounds, total solids (suspended and dissolved), and biochemical oxygen demand. The tests used are listed in Table 8.

TABLE 8

| Test | Analytical Method |
|---|---|
| Heavy Metals | |
| Selenium | ICP[1]/MS[2]/HGAA[4] |
| Aluminum | ICP |
| Iron | ICP |
| Vanadium | ICP |
| Arsenic | GFAA[3] |
| Mercury | GFAA |
| Inorganic Components | |
| Cyanide | Distillation/Colorimetry |
| Soluble Sulfur | E = 90.3[5] |
| Thiosulfate | Titration |
| Dissolved Solids (TDS) | Gravimetric |
| Organic Components | |
| Total organic carbon (TOC) | E-415[5] |
| Phenolics | Distillation |
| COD | Colorimetry |
| BOD | Colorimetry |
| Bioassay | 96-hr static fish kill test |
| Oil and grease | Gravimetric |

[1] ICP denotes inductively coupled plasma spectrophotometric method.
[2] MS denotes mass spectrometry.
[3] GFAA denotes graphite furnace atomic absorption method.
[4] HGAA denotes hydride generation atomic absorption method.
[5] E-# denotes EPA test methods bearing the particular number.

A summary of the characteristics of both the influent sample and effluent sample are given in Table 9:

TABLE 9

| | Summary of Waste Water Characteristics | |
|---|---|---|
| Test | Biotreatment Plant Influent, mg/l | Biotreatment Plant Effluent, mg/l |
| Al | 0.33 | 0.12 |
| Fe | 2.8 | 0.16 |
| V | <0.05 | <0.05 |
| As | <0.002 | <0.002 |
| Hg | <0.001 | <0.001 |
| Se | 675 | 2300 |
| TSS | 5 | <1 |
| TDS | 778 | 805 |
| Soluble S | <0.1 | <0.1 |
| Thiosulfate | 24 | 3.6 |
| Cyanide | 0.18 | 0.02 |
| COD | 1.9 | <1 |
| TOC | 113 | 25.5 |
| BOD | 150 | 15 |
| Phenolics | 0.12 | <0.005 |
| Oil & Grease | 4.8 | 1.9 |

Treatability Studies

Laboratory treatability studies included a series of batch tests to determine the effects of specific conditions upon selenium and cyanide removal. Specifically, samples (two liters each) of the biotreatment plant effluent wastewater were treated batchwise in accordance with the invention to determine the effects of retention time and pH on the rate and extent of selenium and cyanide removal. All experiments were conducted at ambient temperature, using a 15 cm in diameter, 25 cm deep bench-scale reactor made of Lucite brand acrylic resin. The reactor was fitted with four baffles one cm wide, which extended the full length of its sides, resting on 0.5 cm spacers. The baffles functioned to minimize overdosing. Several ports were located on the side of the reactor so that continuous liquid overflow was feasible at several reactor volumes—2,3, and 4 liters. In addition, ports were available for sample collection, pH, ORP, and temperature probes. Air flow was gauged by a rotometer-type flow meter and entered the reactor vessel through a sparge ring in the bottom of the reactor. The air was then dispersed in the liquid phase with a Lightin R-100 brand, 6.2 cm diameter, 6-blade radial flow turbine stirrer powered by a 0.05 kw variable speed motor adjusted to a speed of about 500 rpm.

Approximately 100 ppm of ferrous iron were added and during the batch runs. The air sparge rate was about 3 l/min for the batch runs. The agitation was used during the treatments was enough to disperse the air sparged into the reactor and provide sufficient mixing for pH control. A pH control setpoint was maintained with a dilute sodium hydroxide solution.

1) Effects of pH on Selenium Removal

In order to determine the influence of pH on treatability, split waste water samples were taken from the biotreatment plant effluent sample and neutralized to a specific pH (either pH 6.5 or 7.8) using the sodium hydroxide solution.

Batch treatments were then carried out while maintaining the solution within ±0.2 pH units of the initial setpoint. The results depicted in Table 10 indicate that there is no significant effect of pH upon selenium removal within the pH range of 6.5 and 7.8.

TABLE 10

Effect of pH on Selenium Removal

| Sampling Time (min.): | (Se) mg/l at pH 6.5 | (Se) mg/l at pH 7.8 |
|---|---|---|
| 0 | 2300 | 2300 |
| 30 | 140 | 93 |
| 60 | 81 | 82 |
| 120 | 79 | 79 |

2) Effects of Retention Time on Selenium Removal

To test the effect of contact time on selenium removal, batch experiments employing two aliquot from the biotreatment plant effluent were conducted by subjecting each aliquot to varying hydraulic retention times. The pH of each aliquot was adjusted to pH 6.5. The results are set forth in Table 11:

TABLE 11

Effect of Retention Time on Selenium Removal

| Sampling Time (min.): | Aliquot A Se. mg/l | Aliquot B Se. mg/l |
|---|---|---|
| 0 | 2300 | 2300 |
| 30 | 82 | 140 |
| 60 | 79 | 81 |
| 120 | | 79 |

Removal of selenium to residual level was completed within the first 60 minutes. Therefore, extensive hydraulic retention time is not necessary.

3) Effects of Continuous Flow on Selenium and Cyanide Removal

Based on the results from the above batch experiments, operating parameters were determined for bench-scale continuous flow experiments. In the continuous flow mode, liquid was introduced into the reactor with a metering pump which discharged into the bottom of the reactor. The reactor was adjusted so that about two liters of sample were constantly present in the reactor during the continuous flow experiments. The conditions used in a continuous flow treatment were short residence time (about one hour) and a pH of about 7.8. In addition, the amount of ferrous iron added, the air sparge rate, and the rpm of the stirrer were the same as employed in the batch runs. Both the biotreatment plant influent and effluent samples were tested under these conditions. The results are shown below in Table 12:

TABLE 12

Effect of Continuous Flow on Selenium Removal

| | Biotreatment Plant | |
|---|---|---|
| Sampling Time (min.): | Effluent, Se. mg/l | Influent, Se. mg/l |
| 0 | 2300 | 675 |
| 60 | 22 | 221 |

Table 12 shows that selenium can be effectively removed using a continuous-flow treatment.

The following Table 13 shows that cyanide removal is equally effective for both samples under continuous-flow conditions.

TABLE 13

Effect of Continuous Flow on Cyanide Removal

| | Biotreatment Plant | |
|---|---|---|
| Sampling Time (min.): | Effluent, CN, mg/l | Influent, CN, mg/l |
| 0 | 0.02 | 0.18 |
| 60 | <0.01 | 0.01 |

Bioassay testing was performed on the treated waste water from the continuous-flow treatments to determine the effects of the treatment upon the level of residual biotoxicity.

Results from Bioassay 96-hr static fish kill tests showed that the process of the present invention is capable of enhanced reduction of biotoxicity over biotreatment alone (i.e., 100% survival in the biotreatment plant effluent treated by the process of the present invention versus 90% survival for the untreated biotreatment plant effluent.)

Treatment of the biotreatment plant influent by the process of the present invention alone achieved an LC of 45%, which, in terms of Toxicity-Concentration represents over one third of the biotoxicity reduction achieved by the biotreatment plant system. This is a remarkable level of toxicity reduction given the relatively short reactor residence times used with the process of the present invention. Accordingly, placing the treatment process of the present invention upstream of biotreatment augments biotoxicity reduction as well as buffers the biotreatment system from peaks of toxicants that might otherwise inhibit biological treatment.

EXAMPLE 15

A sample of a biotreatment plant influent (BI) and a sample of the biotreatment plant effluent (BE) were taken and stored in a refrigerated room (about 4° C.) upon receipt. A bench scale continuous treatment system was used to test about 12 liters each of samples BI and BE by the method of the invention. The continuous treatment system used the reaction vessel and stirrer employed in Example 14 to test both samples. The pH of each sample was initially adjusted to about 7.8. Sodium hydroxide (0.25 N) was employed in both continuous treatments to help maintain the pH at about 7.8. The total sodium hydroxide added during sample BI's treatment was about 0.0024 eq/l and the total amount of sodium hydroxide added during sample BE's treatment was about 0.0020 eq/l. About 0.042 gram of Colloidal 691 brand anti-foam was added to sample BI, but no anti-foam was added to sample BE. The air sparge rate used in treating sample BI was maintained at about 0.9 l/min (uncalibrated). However, the air sparge rate used in treating sample BE was about 2 l/min (uncalibrated) with slight foaming. The stirrer was run at about 500 rpm for both samples and the reactor residence time used in treating both samples was about 30 minutes. Ferrous iron was metered in-line to each sample stream. A ferrous iron dosage of 100 ppm was employed in treating sample BI and sufficient ferrous iron was added to sample BE to raise sample BE's ferrous iron content to about 100 ppm.

Nalco 8173 brand flocculant was used to flocculate samples BI and BE. The flocculant was added at 6 ppm for each test. The flocculations were each performed in a 2-liter graduated cylinder. The solids generated from sample BE were allowed to settle out overnight, and the solids generated from sample BI were allowed to settle out for 3 nights prior to removing the solids by filtering each sample through a Whatman #1 brand filter paper. Ten liters of the supernatant obtained from each treated sample were separately stored in plastic containers for the bioassay fish kill test, and about 1 liter of the supernatant obtained from each treated sample was stored in nalgene plastic bottles for the other tests. The final pH of the supernatant obtained from samples BI and BE were about 7.18 and about 7.57, respectively. The results obtained from this experiment are sets forth in Table 14 below.

thene, 1,1-dichloroethene, vinyl chloride, 1,2-dichlorobenzene, and 1,4-dichlorobenzene.

Typically, the oxidant gas employed to oxidize the ferrous ions serves a dual function in that it (a) oxidizes the ferrous ions and (b) acts as a gaseous phase. Accordingly, the volatile organics are partitioned between the gaseous phase and a liquid phase comprising the aqueous solution.

Usually, the gas is introduced proximate the bottom of a treatment vessel at a rate sufficient to achieve an average volumetric flux ratio of gas to water of at least about 20, i.e., on an average at least about 20 unit volumes of gas cross a unit area of a given surface in a specified time interval for each unit volume of water that crosses the same unit area of the surface in the same time interval. It is preferred to use a higher average volumetric flux ratio because the higher the average flux ratio, the faster the removal of the volatile organic from the aqueous solution, all other factors being constant. However, economics dictates a maximum average volumetric flux ratio of about 100. Preferably, the average volumetric flux ratio is about 30 to about 90, and more preferably about 40 to about 80.

One of the major advantages resulting from the pres-

TABLE 14

| TEST | UNITS | BI RAW | BI TREATED | PERCENT REMOVED | BE RAW | BE TREATED | PERCENT REMOVED |
| --- | --- | --- | --- | --- | --- | --- | --- |
| Al | mg/l | 0.18 | 0.04 | 77.8 | 0.24 | 0.06 | 75.0 |
| Fe | mg/l | 0.71 | 0.25 | 64.8 | 0.77 | 0.28 | 63.6 |
| Na | mg/l | 117 | 183 | −56.4 | 121 | 169 | −39.7 |
| V | mg/l | 0.01 | <0.004 | >60.0 | 0.01 | <0.004 | >60.0 |
| As (furnace) | mg/l | 2 | <1 | >50.0 | 3 | 1 | 66.7 |
| Hg | ug/l | 1.3 | 1.6 | −23.1 | 2.0 | 0.5 | 75.0 |
| Se (furnace) | mg/l | 0.43 | 0.59 | −37.2 | 0.44 | <0.05 | >88.6 |
| pH | | 7.05 | 7.18 | NA | 6.92 | 7.57 | NA |
| TSS | mg/l | 52 | 6 | 88.5 | 8 | 4 | 50.0 |
| TDS | mg/l | 476 | 681 | −43.1 | 472 | 598 | −26.7 |
| Cyanide | mg/l | 0.25 | 0.17 | 32.0 | 0.20 | <0.04 | >80.0 |
| BOD | mg/l | 225 | 40 | 82.2 | 230 | 3 | 98.7 |
| COD | mg/l | 542 | 244 | 55.0 | 318 | 42 | 86.8 |
| TOC | mg/l | 227.5 | 63 | 72.3 | 74 | 19 | 74.3 |
| Oil & Grease | mg/l | 50 | <0.1 | >99.8 | 30 | <0.1 | >99.7 |
| Phenolics | mg/l | 16.4 | 1.1 | 93.3 | 9.63 | 0.01 | 99.9 |
| Bioassay, Fish kill LC$_{50}$ | | 500 mg/l | 100,000 mg/l | 19,900 | 100% | 100% | — |

(fish = Flathead minnows)

Table 14 shows that the process of the present invention is capable of simultaneously achieving significant reductions in light metals (e.g., aluminum), heavy metals (e.g., vanadium, mercury, arsenic, selenium), cyanide, TSS, BOD, COD, TOC, oil and grease, as well as phenolics.

In yet another version of the invention, volatile organics are removed from the aqueous solution simultaneously with the removal of any of the above discussed contaminants that may be present in the solution. In general, the method of the present invention can reduce the concentration in the aqueous solution of any volatile organic having a Henry's Law constant of at least about 0.02. Since substances having higher Henry's Law constants are more volatile, and therefore usually easier to remove from a solution, it is preferred that each volatile organic have a Henry's Law constant of at least about 0.05, and more preferably at least about 0.25. Exemplary volatile organics that can be treated by the instant invention include, but are not necessarily limited to, benzene, xylene, ethylbenzene, t-1,2-dichloroethene, trichloroethene, tetrachloroethene, 1,1,1-trichloroeent invention's ability to simultaneously remove volatile organic contaminants and non-volatile contaminants is that the same reaction vessel accomplishes both results. This eliminates additional capital costs. In addition, the vessel need not, and preferably does not, contain any packing material conventionally used in volatile organic removal equipment. By avoiding the use of packing material, the present invention is effective for removing volatile organics without exhibiting the typical decrease in efficiency common to packed towers. The decrease in efficiency is due to the build-up of substances on the packing material and necessitates the periodic cleaning or replacement of the packing material.

The vessel preferably employed in the present invention to simultaneously remove volatile organic and non-volatile contaminants has an internal diameter to internal height ratio much greater than that of vessels conventionally used to remove volatile organics. Typically, the vessel employed in the present invention has an internal diameter to internal height ratio of about 1:1 to about 1:4, preferably about 1:1.1 to about 1:3, and more preferably about 1:1.2 to about 1:2. For example, very desirable vessels have internal diameter to internal height ratios of about 6 feet to about 9 feet, about 8 feet to about 12 feet, and about 11 feet to about 15 feet. In addition, the impeller of the mixer employed to shear the gas bubbles generally has a diameter of about 30 to about 40 percent of the internal diameter of the vessel, and the sparger employed to distribute the bubbles generally has a diameter about 75 to about 85 percent of the diameter of the impeller.

The removal of volatile organics from the aqueous solution can be performed either by a batch or a continuous process. In the batch process, the solution is generally sparged with the oxidant gas for a least about 15 minutes. In the continuous process, the average residence time that the solution is sparged with the oxidant gas is also about 15 minutes. The maximum sparge or treatment time for both methods is also dictated by economics and is generally about 2 hours. Preferably, the treatment time is about 0.5 to about 1.5 hours.

Another parameter affecting the volatile organic removal efficacy of the process of the present invention is the pH of the aqueous solution being treated. Preferably, the pH of the aqueous solution is maintained with a range of about 6 to about 9.5, more preferably within a range of about 6.5 to about 9, and optimally within a range of about 7.5 to about 8. The pH can be maintained within these ranges with a base, such as one selected from the group consisting of ammonia, hydroxide containing bases, and mixtures thereof. When necessary, the pH can be maintained within these ranges with an acid.

The size of the bubbles being sparged or introduced into the aqueous solution can also affect the ability of the present invention to remove volatile organics from aqueous solutions. In general, the smaller the bubble size the more surface area available for mass transfer of the volatile organics between the liquid and gas phases. Accordingly, it is preferred to reduce the average bubble diameter by strongly agitating the solution.

Typically, the process of the present invention reduces the concentration of each volatile organic present (as well as the total volatile organics) in an aqueous solution by at least about 80 percent. Depending on the type of volatile organic being removed, the treatment time, the average volumetric flux ratio of gas to water, the pH of the aqueous solution being treated, and the volatile organic mass transfer rate between the liquid and gas phases, the process of the instant invention is capable of removing more than about 90 percent, preferably more than about 95 percent, and even substantially all of the volatile organics initially present in the aqueous solution.

The volatile organic removal efficiency in present invention the can also be increased by repeatedly treating an aqueous solution. For example, the effluent from a first treatment stage can be subjected to a similar treatment to obtain comparable further reductions of any volatile organic and/or other above described contaminant.

The following examples illustrate embodiments of the invention wherein volatile organics and other contaminants are simultaneously removed from an aqueous solution.

EXAMPLE 16

A sample of waste water combined from different sources was characterized for heavy metals and inorganic and organic compounds using the analytical methods listed in Table 15.

TABLE 15

| Test Methods | |
|---|---|
| Test | Analytical Method |
| Heavy Metals | |
| Copper | ICP |
| Lead | ICP |
| Iron | ICP |
| Mercury | GFAA |
| Selenium | HGAA |
| Inorganic Components | |
| Cyanide | Distillation/Colorimetry |
| Phenolics | E-402.1 |
| Organic Components | |
| Benzene | E-8020/5030 |
| Toluene | E-8020/5030 |
| Xylene | E-8020/5030 |
| Ethylbenzene | E-8020/5030 |

A summary of the raw waste water characteristics is given in Table 16.

TABLE 16

| | |
|---|---|
| Benzene, mg/l | 17.9 |
| Toluene, mg/l | 41.9 |
| Xylenes, mg/l | 32.6 |
| Ethylbenzene, mg/l | 5.57 |
| 1,3 Dichlorobenzene, mg/l | 7.65 |
| 1,4 Dichlorobenzene, mg/l | 3.1 |
| 1,2 Dichlorobenzene, mg/l | 2.3 |
| Chlorobenzene, mg/l | <2.5 |
| Iron, mg/l | 47.8 |
| Copper, mg/l | 0.15 |
| Lead, mg/l | 0.77 |
| Selenium, ug/l | 3 |
| Mercury, ug/l | <1 |
| Cyanide, mg/l | 0.05 |
| Oil & Grease, mg/l | 9.1 |
| Phenolics, mg/l | 21 |

The reactor vessel and stirrer used to evaluate waste water treatability were the same as employed in Examples 14 and 15. All treatments were carried out on a batch basis under steady state conditions with respect to temperature, air-flow rate, and turbine speed. Samples were taken with a syringe, flocculated with 0.5 ml of 0.3 g/l Nalco 8173 brand flocculent, filtered, and transferred to a 40 ml volatile organic analysis (VOA) vial.

Analyses for benzene, toluene, xylene, and ethylbenzene (BTXE) were done by liquid chromatography and metals analyses were done by emission spectroscopy.

Simultaneous Treatment

Enough caustic was added to the slightly acidic sample to bring its pH up to about 7.7. Although analysis of the raw sample indicated that the sample contained a considerable amount of iron, ferrous iron (100 ppm) was added. Treatment began with the initiation of air flow (about 2.8 l/min) and continued for a period of about 80 minutes. Treatment results are given in Table 17.

TABLE 17

| Simultaneous Treatment (Metals and VOC) | | | | | | | | |
|---|---|---|---|---|---|---|---|---|
| Results: VOC (as BTXE) | | | | | | | | |
| Time | Benzene | % | Toluene | % | Xylene | % | Ethyl benzene | % |

TABLE 17-continued

| | Simultaneous Treatment (Metals and VOC) | | | | | | | |
|---|---|---|---|---|---|---|---|---|
| Min. | mg/l | Reduction | mg/l | Reduction | mg/l | Reduction | mg/l | Reduction |
| 0 | 11 | — | 13 | — | 8.1 | — | 5.6 | — |
| 6 | 2.9 | 73.6 | 3.8 | 70.1 | 1.8 | 77.8 | 0.63 | 88.8 |
| 12 | 0.79 | 92.8 | 0.92 | 92.9 | 0.57 | 93.0 | 0.15 | 97.3 |
| 18 | 0.29 | 97.4 | 0.21 | 98.4 | 0.086 | 98.9 | 0.041 | 99.3 |
| 24 | 0.22 | 98.0 | 0.065 | 99.5 | 0.086 | 98.9 | 0.010 | 99.8 |
| 30 | 0.19 | 98.3 | 0.027 | 99.8 | 0.043 | 99.5 | 0.010 | 99.8 |

| | Results: Metals | | | | | |
|---|---|---|---|---|---|---|
| Time, Min. | Copper, mg/l | % Reduction | Lead mg/l | % Reduction | Iron mg/l | % Reduction |
| 0 | 0.15 | — | 0.77 | — | 147.8 | — |
| 7 | <0.03 | 80.0 | <0.04 | 94.8 | 17.8 | 88.0 |
| 13 | <0.03 | 80.0 | <0.04 | 94.8 | 0.3 | 99.8 |
| 25 | <0.03 | 80.0 | <0.04 | 94.8 | 1.1 | 99.3 |
| 31 | 0.04 | 73.3 | <0.04 | 94.8 | 0.6 | 99.6 |

Sequential Treatment

Treatment was carried out as described above for simultaneous treatment with the exception that the ferrous iron was added after air stripping for about 60 minutes. Treatment results are given in Table 18.

TABLE 18

| | Sequential Treatment (Metals and VOC) | | | | | | | |
|---|---|---|---|---|---|---|---|---|
| | Results: VOC (as BTXE) | | | | | | | |
| Time, Min. | Benzene mg/l | % Reduction | Toluene mg/l | % Reduction | Xylene mg/l | % Reduction | Ethyl benzene mg/l | % Reduction |
| 0 | 8.3 | — | 14.2 | — | 4.4 | — | 2.8 | — |
| 10 | 0.87 | 89.5 | 1.3 | 90.8 | 1.2 | 72.7 | 0.3 | 89.3 |
| 20 | 0.22 | 97.3 | 0.092 | 99.4 | 0.15 | 96.6 | 0.040 | 98.6 |
| 60 | 0.14 | 98.3 | 0.023 | 99.8 | 0.050 | 98.9 | 0.015 | 99.5 |
| 90 | 0.11 | 98.7 | 0.012 | 99.9 | 0.014 | 99.7 | 0.010 | 99.6 |
| 120 | 0.06 | 99.3 | 0.011 | 99.9 | 0.011 | 99.8 | 0.006 | 99.8 |

| | Results: Metals | | | | | |
|---|---|---|---|---|---|---|
| Time, Min. | Copper, mg/l | % Reduction | Lead mg/l | % Reduction | Iron mg/l | % Reduction |
| 0 | 0.15 | — | 0.77 | — | 47.8 | — |
| 30 | <0.03 | 80.0 | <0.04 | 94.8 | 1.2 | 97.5 |
| 60 | <0.03 | 80.0 | <0.04 | 94.8 | 1.6* | 96.7 |
| 70 | 0.07 | 53.3 | <0.04 | 94.8 | 0.3 | 99.7 |

*Measured prior to the addition of 100 ppm soluble iron, i.e., after taking an aliquot of the treated sample 60 minutes into the run. 100 ppm of ferrous iron were added to raise the iron content of the the sample to about 101.6 ppm.

The data set forth in Tables 17 and 18 indicate that simultaneous and sequential treatments yield comparable results. In addition, the fact that (a) the composite sample contained a relatively large amount of iron and (b) the metals treatment took place within the initial 60-minute period indicates that metal encapsulation and VOC stripping are occurring simultaneously, even when additional ferrous iron is added sequentially. Since a substantial reduction in the metals content was obtained prior to the addition of ferrous iron (see Table 18), the waste iron found in the raw sample is suitable as a ferrous iron source for use in the treatment process of the instant invention.

The data set forth in Tables 17 and 18 also indicate that an aqueous sample can be treated first to remove the volatile organics and then to remove the non-volatile organic contaminants or can be treated to simultaneously remove both the volatile organic and non-volatile organic contaminants. Accordingly, in a further embodiment of the present invention an aqueous solution is treated to remove its volatile organic contents irrespective of whether any non-volatile contaminants are also simultaneously removed.

The parameters discussed above with respect to simultaneously removing volatile organic and non-volatile organic contaminants, i.e., the treatment time, the average volumetric flux ratio of gas to water, the pH of the aqueous solution being treated, and the average size of the gas bubbles, are equally applicable when the only contaminant of concern are volatile organics. In addition, the above discussed reactor vessel is also preferably employed to remove volatile organics. However, since there is no need to oxidize any ferrous ions, the gas employed to remove volatile organics need not be limited to oxidizing gases. A commercially available non-oxidizing gas that can be used in this version of the invention is nitrogen. Nevertheless, since air is the cheapest available gas, air is still the gas of choice.

In the following example, a solution is treated to reduce its volatile organic content.

EXAMPLE 17

The system used to evaluate diffused air stripping were the same as employed in Examples 14–16. Two samples were treated in a batch mode. In the batch mode test, the air flow control valve was adjusted to give the desired flow and then the main shutoff valve was closed. The reactor was filled with a predetermined amount of liquid. The turbine was adjusted to a rotation speed of about 500 rpm. An initial sample was taken with the timer started when the gas shutoff valve was opened. Gas flow rate, temperature, and turbine speed were monitored throughout the run. Samples were taken with a syringe and transferred to a 40 ml VOA vial. The parameters used in each batch mode run are set forth in Table 19.

One sample was treated in a continuous mode. In the continuous mode, liquid was pumped into the reactor via a tube that opened at the bottom of the reactor and exited from an overflow port on the side of the reactor. The reactor was filled with liquid and air stripping was run on a volume (air) to volume (liquid) ratio basis using previous batch test results to estimate the proper ratio. The objective was to get close to steady state conditions. After the liquid metering pump was started and the system operated for at least three volume changes, the inlet and outlet liquid flows were sampled and analyzed. The parameters used in the continuous mode run are also set forth in the following Table 19.

TABLE 19

| Experimental Conditions | | | |
|---|---|---|---|
| | Run Number | | |
| | Batch Mode | | Continuous Mode |
| | 1 | 2 | 3 |
| Reactor volume - liter | 2 | 2 | 2 |
| Air flow rate - l min$^{-1}$ | 1.0 | 2.0 | 1.2 |
| Water flow rate - ml min$^{-1}$ | — | — | 15 |
| Temperature - °C. | 10 | 10 | 10 |
| Mixer - RPM | 500 | 500 | 500 |

The 40 ml VOA samples were analyzed by EPA methods 601 and 602. The results are set forth in Tables 20–22.

TABLE 20

| | Run 1 | | | | | | |
|---|---|---|---|---|---|---|---|
| | | | Time, minutes | | | | |
| | | 15 | | 30 | | 45 | |
| Volatile Organics | 0 (ug/l) | (ug/l) | % Reduction | (ug/l) | % Reduction | (ug/l) | % Reduction |
| Toluene | 410 | 150 | 36.6 | 52 | 87.3 | 19 | 95.4 |
| Benzene | 12 | 3.9 | 67.5 | 1.5 | 87.5 | 0.7 | 94.2 |
| Xylenes | 180 | 60 | 66.7 | 25 | 86.1 | 10 | 94.4 |
| Ethylbenzene | 32 | 8.8 | 72.5 | 2.7 | 91.6 | 0.9 | 97.2 |
| t-1, 2-dichloroethene | 6.3 | 1.0 | 84.1 | ND[1] | 100 | ND | 100 |
| trichloroethene | 7300 | 1500 | 79.5 | 480 | 93.4 | 148 | 98.0 |
| tetrachloroethene | 2300 | 450 | 80.4 | 55 | 97.6 | 9.1 | 99.6 |
| 1,1,1-trichloroethene | 3.2 | ND | 100 | ND | 100 | ND | 100 |
| 1,1-dichloroethene | 5.8 | ND | 100 | ND | 100 | ND | 100 |
| vinyl chloride | 32 | ND | 100 | ND | 100 | ND | 100 |
| 1,2-dichlorobenzene | 110 | 83 | 24.5 | 73 | 33.6 | 48 | 56.4 |
| 1,4-dichlorobenzene | 19 | 12 | 36.8 | 5.1 | 73.2 | 5.2 | 72.6 |

| | Time, minutes | | | | | |
|---|---|---|---|---|---|---|
| | 60 | | 75 | | 90 | |
| Volatile Organics | (ug/l) | % Reduction | (ug/l) | % Reduction | (ug/l) | % Reduction |
| Toluene | 10 | 97.6 | 3.1 | 99.2 | 1.8 | 99.6 |
| Benzene | 0.7 | 94.2 | ND | 100 | 0.6 | 95.0 |
| Xylenes | 3 | 98.3 | 0.9 | 99.5 | 1.0 | 99.4 |
| Ethylbenzene | ND | 100 | ND | 100 | ND | 100 |
| t-1, 2-dichloroethene | ND | 100 | ND | 100 | ND | 100 |
| trichloroethene | 25 | 99.7 | 18 | 99.8 | 11 | 99.8 |
| tetrachloroethene | 2.5 | 99.9 | 2.3 | 99.9 | 1.7 | 99.9 |
| 1,1,1-trichloroethene | ND | 100 | ND | 100 | ND | 100 |
| 1,1-dichloro- | ND | 100 | ND | 100 | ND | 100 |

TABLE 20-continued

| | | | Run 1 | | | |
|---|---|---|---|---|---|---|
| ethene | | | | | | |
| vinyl chloride | ND | 100 | ND | 100 | ND | 100 |
| 1,2-dichlorobenzene | 41 | 62.7 | 36 | 67.2 | 12 | 89.1 |
| 1,4-dichlorobenzene | 2 | 89.5 | 1.2 | 93.7 | 1.3 | 93.2 |

¹ND denotes none detected.

TABLE 21

| | Run 2 | | | | | | |
|---|---|---|---|---|---|---|---|
| | | | | Time, minutes | | | |
| | | 15 | | 30 | | 45 | |
| Volatile Organics | 0 (ug/l) | (ug/l) | % Reduction | (ug/l) | % Reduction | (ug/l) | % Reduction |
| Toluene | 84,000 | 61,000 | 27.4 | 28,000 | 66.7 | 19,000 | 77.4 |
| Benzene | 150 | 47 | 68.7 | 13 | 91.3 | ND | 100 |
| Xylenes | 15,000 | 11,000 | 26.7 | 8,300 | 44.7 | 6,000 | 60.0 |
| Ethylbenzene | 2,300 | 1,500 | 34.8 | 990 | 57.0 | 580 | 74.8 |
| trichloroethene | 1,700 | 490 | 71.2 | 100 | 94.1 | 26 | 98.5 |
| tetrachloroethene | 7,900 | 3,900 | 50.6 | 1,800 | 77.2 | 790 | 90.0 |
| 1,1,1-trichloroethene | 3,800 | 540 | 85.8 | 47 | 98.8 | 4.6 | 99.9 |
| 1,1-dichloroethene | 11 | 2.9 | 73.6 | 0.6 | 94.5 | ND | 100 |
| vinyl chloride | 16 | ND | 100 | ND | 100 | ND | 100 |
| 1,2-dichlorobenzene | 2,300 | 2,100 | 8.7 | 2,500 | −8.7 | 2,700 | −17.4 |
| 1,4-dichlorobenzene | 380 | 300 | 21.1 | 391 | −2.9 | 690 | −81.6 |

| | Time, minutes | | | | | |
|---|---|---|---|---|---|---|
| | 60 | | 75 | | 90 | |
| Volatile Organics | (ug/l) | % Reduction | (ug/l) | % Reduction | (ug/l) | % Reduction |
| Toluene | 8,700 | 89.6 | 790 | 99.1 | 1.0 | 100 |
| Benzene | ND | 100 | ND | 100 | ND | 100 |
| Xylenes | 4,000 | 73.3 | 1,900 | 87.3 | 760 | 94.9 |
| Ethylbenzene | 344 | 85.0 | 130 | 94.3 | 44 | 98.1 |
| trichloroethene | ND | 100 | ND | 100 | ND | 100 |
| tetrachloroethene | 330 | 95.8 | 72 | 99.1 | 10 | 99.9 |
| 1,1,1-trichloroethene | 1.1 | 100 | ND | 100 | 0.7 | 100 |
| 1,1-dichloroethene | ND | 100 | ND | 100 | ND | 100 |
| vinyl chloride | ND | 100 | ND | 100 | ND | 100 |
| 1,2-dichlorobenzene | 2,600 | −13.0 | 2,100 | 8.7 | 1,900 | 17.4 |
| 1,4-dichlorobenzene | 710 | −86.8 | 260 | 31.6 | 200 | 47.4 |

TABLE 22

| | Run 3 | | | | | | |
|---|---|---|---|---|---|---|---|
| | Reactor 1 | | | Reactor 2 | | | Overall |
| Volatile Organics | In (ug/l) | Out (ug/l) | % Reduction | In (ug/l) | Out (ug/l) | % Reduction | % Reduction |
| Toluene | 32,000 | 9,500 | 70.3 | 9,200 | 1,100 | 88.0 | 96.6 |
| Benzene | 28 | 2.9 | 89.6 | 1.8 | ND | 100 | 100 |
| Xylenes | 10,000 | 1,000 | 90.0 | 880 | 59 | 93.3 | 99.4 |
| Ethyl-benzene | 1,900 | 140 | 92.6 | 110 | 8.7 | 92.1 | 99.5 |
| tri-chloro-ethene | 1,500 | 60 | 96.0 | 45 | 3.5 | 92.2 | 99.8 |
| tetra-chloro-ethene | 4,400 | 180 | 95.9 | 134 | 7.9 | 94.1 | 99.8 |
| 1,1,1-tri-chloro-ethene | 1,400 | 35 | 97.5 | 27 | 1.1 | 95.9 | 99.9 |
| 1,1-dichloro-ethene | 12 | 3.2 | 73.3 | ND | ND | — | — |
| vinyl chloride | 18 | ND | 100 | ND | ND | 100 | 100 |
| 1,2-dichloro-benzene | 2,600 | 560 | 78.5 | 540 | 87 | 83.9 | 96.7 |
| 1,4-dichloro-benzene | 610 | 170 | 72.1 | 150 | 12 | 92.0 | 98.0 |

The data set forth in Tables 20 to 22 indicate that excellent reductions in volatile organic concentrations are obtainable by the process of the present invention.

Other aspects of this invention are described in U.S. Pat. applications Ser. No. 477,212, filed Mar. 21, 1983, now abandoned, and U.S. Pat. Ser. No. 042,565, filed Apr. 16, 1987, as well as European patent application 84901534.2, filed Nov. 20, 1984, these documents being incorporated herein by reference.

Although the present invention has been described in considerable detail with reference to certain preferred versions thereof, other versions are possible. For example, the reactor vessel, although described as having an average diameter to height length ratio, can have a cross-sectional area shape that is polygonal as well as circular. In addition, the volatile organic removal embodiment of the present invention can be employed with prior art processes adapted to remove non-volatile contaminants, e.g., the mercury and sulfide precipitation processes. In general, an aqueous solution is treated by the prior art process with the simultaneous introduction of a gas into the aqueous solution as taught herein. Furthermore, the processes of the present invention can be use to treat effluents from prior art waste water treatment processes. Therefore, the spirit and scope of the appended claims should not necessarily be limited to the description of the preferred versions contained herein.

What is claimed is:

1. A method for removing one or more contaminants selected from the group consisting of aluminum ions, beryllium ions, and mixtures thereof from an aqueous solution comprising the contaminants and ferrous ions, the method comprising the steps of:
    (a) rapidly oxidizing substantially all the ferrous ions in the solution to ferric ions so as to rapidly form a substantially completely amorphous precipitate comprising a substantial portion of ferric hydroxide and a substantial portion of the contaminants; and
    (b) separating the amorphous precipitate from the solution so as to form an effluent solution having a substantially reduced contaminant concentration, wherein substantially all of the ferrous ions in the solution are oxidized to ferric ions within a period of less than about 30 minutes; step (a) includes the steps of introducing air into the solution at a rate of about 1 to about 10 l air per about 1,000 ppm ferrous ion present in the solution prior to step (a), and controlling the pH of the solution so that the pH of the solution is about 6 to about 9.5; and the total concentration of the contaminants in the effluent solution is less than about 10% of the concentration of the contaminants in the aqueous solution prior to step (a).

2. The method of claim 1 wherein step (a) includes the step of controlling the pH of the solution with a base selected from the group consisting of ammonia, hydroxide containing bases, and mixtures thereof.

3. The method of claim 1 wherein substantially all of the ferrous ions in the solution are oxidized to ferric ions within a period of less than about 15 minutes.

4. The method of claim 1 wherein substantially all of the ferrous ions in the solution are oxidized to ferric ions within a period of less than about 10 minutes.

5. The method of claim 1 wherein step (a) includes the step of introducing air into the solution at a rate of about 2 to about 8 l air per about 1000 ppm ferrous ion present in the solution prior to step (a).

6. The method of claim 1 wherein step (a) includes the step of mixing the aqueous solution.

7. The method of claim 1 wherein step (a) includes the step of controlling the pH of the solution so that the pH of the solution is about 6.5 to about 9.

8. The method of claim 1 wherein step (a) includes the step of controlling the pH of the solution so that the pH of the solution is about 7.5 to about 8.

9. The method of claim 1 wherein the total concentration of the contaminants in the effluent solution is less than about 5% of the concentration of the contaminants in the aqueous solution prior to step (a).

10. The method of claim 1 wherein the total concentration of the contaminants in the effluent solution is less than about 1% of the concentration of the contaminants in the aqueous solution prior to step (a).

11. The method of claim 1 wherein substantially all of the ferrous ions in the solution are oxidized to ferric ions within a period of less than about 15 minutes; step (a) includes the steps of introducing air into the solution at a rate of about 2 to about 8 l air per about 1000 ppm ferrous ion present in the solution prior to step (a), and controlling the pH of the solution so that the pH of the solution is about 6.5 to about 9; and the total concentration of the contaminants in the effluent solution is less than about 5% of the concentration of the contaminants in the aqueous solution prior to step (a).

12. The method of claim 1 wherein substantially all of the ferrous ions in the solution are oxidized to ferric ions within a period of less than about 10 minutes; step (a) includes the steps of introducing air into the solution at a rate of about 4 to about 10 l air per about 1000 ppm ferrous ion present in the solution prior to step (a), and controlling the pH of the solution so that the pH of 13. The method of claim 1 further comprising the steps of:
   (c) introducing additional ferrous ions in the effluent solution to form a modified effluent solution;
   (d) rapidly oxidizing substantially all the ferrous ions in the modified effluent solution to ferric ions so as to rapidly form a second substantially completely amorphous precipitate comprising a substantial portion of ferric hydroxide and a substantial portion of any contaminant present in the effluent solution; and
   (e) separating the second precipitate from the modified effluent solution so as to form a second effluent solution having a contaminant concentration less than the contaminant concentration of the effluent solution.

14. The method of claim 13 wherein step (d) includes the step of controlling the pH of the modified effluent solution.

15. The method of claim 13 wherein substantially all of the ferrous ions in the modified effluent solution are oxidized to ferric ions within a period of less than about 30 minutes.

16. The method of claim 13 wherein step (d) includes the step of introducing air into the modified effluent solution at a rate of at least about 1 l air per 1000 ppm ferrous ion present in the modified effluent solution prior to step (d).

17. The method of claim 13 wherein step (d) includes the step of introducing air into the modified effluent solution at a rate of at least about 10 l air 1000 ppm ferrous ion present in the modified effluent solution prior to step (d).

18. The method of claim 13 wherein step (d) includes the step of mixing the aqueous solution.

19. The method of claim 13 wherein step (d) includes the step of controlling the pH of the modified effluent solution so that the pH of the modified effluent solution is about 6 to about 9.5.

20. The method of claim 1 wherein the method is a continuous process.

21. The method of claim 1 wherein the method is a batch process.

22. The method of claim 1 wherein the amorphous precipitate contains essentially all of the ferric ions formed in step (a).

23. The method of claim 1 wherein the amorphous precipitate consists essentially of an amorphous material.

24. The method of claim 1 wherein the contaminant is beryllium ions.

25. A method of removing contaminants selected from the group consisting of aluminum ions, beryllium ions, cyanide ions, and mixtures thereof from an aqueous solution comprising the contaminants and ferrous ions, the method comprising the steps of:
   (a) rapidly oxidizing substantially all the ferrous ions in the solution to ferric ions so as to rapidly form a substantially completely amorphous precipitate comprising a substantial portion of ferric hydroxide and a substantial portion of the contaminants; and
   (b) separating the amorphous precipitate from the solution so as to form an effluent solution having a substantially reduced contaminant concentration, wherein a portion of the contaminant concentration, wherein a portion of the contaminants are cyanide ions and a portion of the contaminants are selected from the group consisting of aluminum ions, beryllium ions, and mixtures thereof; the molar ratio of the ferrous ions to the contaminants in the aqueous solution is about 1:1 to about 10:1; substantially all of the ferrous ions in the solution are oxidized to ferric ions within a period of less than about 30 minutes; step (a) includes the steps of introducing air into the solution at a rate of about 1 to about 10 l air per about 1,000 ppm ferrous ion present in the solution prior to step (a), and controlling the pH of the solution so that the pH of the solution is about 6 to about 9.5; the substantially completely amorphous precipitate comprises a substantial portion of the cyanide ions; the effluent solution has a substantially reduced concentration of the cyanide ions; and the total concentration of the contaminants in the effluent solution is less than about 10% of the concentration of the contaminants in the aqueous solution prior to step (a).

26. The method of claim 25 wherein the molar ratio of the ferrous ions to the contaminants in the aqueous solution is at least about 4:1.

27. The method of claim 25 wherein the molar ratio of the ferrous ions to the contaminants in the aqueous solution is at least about 8:1.

28. The method of claim 25 further comprising the step of adding ferrous ions to the aqueous solution to increase the ferrous ion-contaminant molar ratio to at least about 1:1.

29. The method of claim 25 further comprising the step of adding ferrous ions to the aqueous solution to increase the ferrous ion-contaminant molar ratio to at least about 4:1.

30. The method of claim 25 further comprising the step of adding ferrous ions to the aqueous solution to increase the ferrous ion-contaminant molar ratio to at least about 8:1.

31. The method of claim 25 wherein the molar ratio of the ferrous ions to the contaminants in the aqueous solution is about 2:1 to about 8:1; substantially all of the ferrous ions in the solution are oxidized to ferric ions within a period of less than about 15 minutes; step (a) includes the steps of introducing air into the solution at a rate of about 2 to about 8 l air per about 1000 ppm ferrous ion present in the solution prior to step (a), and controlling the pH of the solution so that the pH of the solution is about 6.5 to about 9; and the total concentration of the contaminants in the effluent solution is less than about 5% of the concentration of the contaminants in the aqueous solution prior to step (a).

32. The method of claim 25 wherein the molar ratio of the ferrous ions to the contaminants in the aqueous solution is about 4:1 to about 8:1; substantially all of the ferrous ions in the solution are oxidized to ferric ions within a period of less than about 10 minutes; step (a) includes the steps of introducing air into the solution at a rate of about 4 to about 10 l air per about 1000 ppm ferrous ion present in the solution prior to step (a), and controlling the pH of the solution so that the pH of the solution is about 7.5 to about 8; and the total concentration of the contaminants in the effluent solution is less than about 1% of the concentration of the contaminants in the aqueous solution prior to step (a).

33. The method of claim 25 wherein a portion of the contaminants are beryllium ions.

34. The method of claim 25 wherein substantially all of the ferrous ions in the solution are oxidized to ferric ions within a period of less than about 15 minutes.

35. The method of claim 25 wherein substantially all of the ferrous ions in the solution are oxidized to ferric ions within a period of less than about 10 minutes.

36. The method of claim 25 wherein step (a) includes the step of introducing air into the solution at a rate of about 2 to about 8 l per about 1000 ppm ferrous ion present in the solution prior to step (a).

37. The method of claim 25 wherein step (a) includes the step of controlling the pH of the solution so that the pH of the solution is about 6.5 to about 9.

38. The method of claim 25 wherein step (a) includes the step of controlling the pH of the solution so that the pH of the solution is about 7.5 to about 8.

39. The method of claim 25 wherein the total concentration of the contaminants in the effluent solution is less than about 5% of the concentration of the contaminants in the aqueous solution prior to step (a).

40. The method of claim 25 wherein the total concentration of the contaminants in the effluent solution is less than about 1% of the concentration of the contaminants in the aqueous solution prior to step (a).

41. The method of claim 25 further comprising the step of adding ferrous ions to the aqueous solution to increase the ferrous ion-contaminant molar ratio to at least about 1:1.

42. The method of claim 25 further comprising the step of adding ferrous ions to the aqueous solution to increase the ferrous ion-contaminant molar ratio to at least about 4:1.

43. The method of claim 25 further comprising the step of adding ferrous ions to the aqueous solution to increase the ferrous ion-contaminant molar ratio to at least about 8:1.

44. A method for removing contaminants selected the group consisting of aluminum ions, beryllium ions, heavy metal ions, and mixtures thereof from an aqueous solution comprising the contaminants and ferrous ions, the method comprising the steps of:
  (a) rapidly oxidizing substantially all the ferrous ions in the solution to ferric ions so as to rapidly form a substantially completely amorphous precipitate comprising a substantial portion of ferric hydroxide and a substantial portion of the contaminants; and
  (b) separating the amorphous precipitate from the solution so as to form an effluent solution having a substantially reduced contaminant concentration, wherein a portion of the contaminants are at least one heavy metal ion and a portion of the contaminants are selected from the group consisting of aluminum ions, beryllium ions, and mixtures thereof; the weight ratio of the ferrous ions to the contaminants in the aqueous solution is at least about 1:1; substantially all of the ferrous ions in the solution are oxidized to ferric ions within a period of less than about 30 minutes; step (a) includes the steps of introducing air into the solution at a rate of about 1 to about 10 l air per about 1000 ppm ferrous ion present in the solution prior to step (a), and controlling the pH of the solution so that the pH of the solution is about 6 to about 9.5: the substantially completely amorphous precipitate comprises a substantial portion of the heavy metal ions; the effluent solution has a substantially reduced concentration of the heavy metal ions; and the total concentration of the contaminants in the effluent solution is less than about 10% of the concentration of the contaminants in the aqueous solution prior to step (a).

45. The method of claim 44 wherein the weight ratio of the ferrous ions to the contaminants in the aqueous solution is less than about 10:1.

46. The method of claim 44 wherein the weight ratio of the ferrous ions to the contaminants in the aqueous solution is about 1:1 to about 10:1.

47. The method of claim 44 wherein the weight ratio of the ferrous ions to the contaminants in the aqueous solution is about 4:1 to about 6:1.

48. The method of claim 44 wherein the weight ratio of the ferrous ions to the contaminants in the aqueous solution is about 1:1 to about 10:1; substantially all of the ferrous ions in the solution are oxidized to ferric ions within a period of less than about 15 minutes; step (a) includes the steps of introducing air into the solution at a rate of about 2 to about 8 l air per about 1000 ppm ferrous ion present in the solution prior to step (a), and controlling the pH of the solution so that the pH of the solution is about 6.5 to about 9; and the total concentration of the contaminants in the effluent solution is less than about 5% of the concentration of the contaminants in the aqueous solution prior to step (a).

49. The method of claim 44 wherein the weight ratio of the ferrous ions to the contaminants in the aqueous solution is about 4:1 to about 6:1; substantially all of the ferrous ions in the solution are oxidized to ferric ions within a period of less than about 10 minutes; step (a) includes the steps of introducing air into the solution at a rate of about 4 to about 10 l air per about 1000 ppm ferrous ion present in the solution prior to step (a), and controlling the pH of the solution so that the pH of the solution is about 7.5 to about 8; and the total concentration of the contaminants in the effluent solution is less than about 1% of the concentration of the contaminants in the aqueous solution prior to step (a).

50. The method of claim 44 wherein the contaminants further comprise step (a) includes the step of occluding a substantial portion of the heavy metal contaminant in the amorphous precipitate.

51. The method of claim 44 wherein a portion of the contaminants are beryllium ions.

52. The method of claim 44 wherein substantially all of the ferrous ions in the solution are oxidized to ferric ions within a period of less than about 15 minutes.

53. The method of claim 44 wherein substantially all of the ferrous ions in the solution are oxidized to ferric ions within a period of less than about 10 minutes.

54. The method of claim 44 wherein step (a) includes the step of introducing air into the solution at a rate of about 2 to about 8 l per about 1000 ppm ferrous ion present in the solution prior to step (a).

55. The method of claim 44 wherein step (a) includes the step of controlling the pH of the solution so that the pH of the solution is about 6.5 to about 9.

56. The method of claim 44 wherein step (a) includes the step of controlling the pH of the solution so that the pH of the solution is about 7.5 to about 8.

57. The method of claim 44 wherein the total concentration of the contaminants in the effluent solution is less than about 5% of the concentration of the contaminants in the aqueous solution prior to step (a).

58. The method of claim 44 wherein the total concentration of the contaminants in the effluent solution is less than about 1% of the concentration of the contaminants in the aqueous solution prior to step (a).

59. The method of claim 44 further comprising the step of adding ferrous ions to the aqueous solution to increase the ferrous ion-contaminant molar ratio to at least about 1:1.

60. The method of claim 44 further comprising the step of adding ferrous ions to the aqueous solution to increase the ferrous ion-contaminant molar ratio to at least about 4:1.

61. The method of claim 44 further comprising the step of adding ferrous ions to the aqueous solution to increase the ferrous ion-contaminant molar ratio to at least about 8:1.

62. A method for removing contaminants selected from the group consisting of aluminum ions, beryllium ions, cyanide ions, heavy metal ions, and mixtures thereof from an aqueous solution comprising the contaminants and ferrous ions, the method comprising the steps of:
(a) rapidly oxidizing substantially all the ferrous ions in the solution to ferric ions so as to rapidly form a substantially completely amorphous precipitate comprising a substantial portion of ferric hydroxide and a substantial portion of the contaminants; and
(b) separating the amorphous precipitate from the solution so as to form an effluent solution having a substantially reduced contaminant concentration, wherein a portion of the contaminants are cyanide ions and at least one heavy metal ion and a portion of the contaminants are selected from the group consisting of aluminum ions, beryllium ions, and mixtures thereof; the substantially completely amorphous precipitate comprises a substantial portion of the cyanide ions and the heavy metal ions; the effluent solution has a substantially reduced concentration of the cyanide ions and the heavy metal ions; the concentration of the ferrous ions in the aqueous solution is equal to about one to about ten times the molar concentration of the contaminants; substantially all of the ferrous ions in the solution are oxidized to ferric ions within a period of less than about 30 minutes; step (a) includes the steps of introducing air into the solution at a rate of about 1 to about 10 l air per about 1,000 ppm ferrous ion present in the solution prior to step (a), and controlling the pH of the solution so that the pH of the solution is about 6 to about 9.5; and the total concentration of the contaminants in the effluent solution is less than about 10% of the concentration of the contaminants in the aqueous solution prior to step (a).

63. The method of claim 62 wherein the concentration of the ferrous ions in the aqueous solution is equal to about two to about eight times the molar concentration of the contaminants.

64. The method of claim 62 wherein the concentration of the ferrous ions in the aqueous solution is equal to about four to about six times the molar concentration of the contaminants.

65. The method of claim 62 wherein the concentration of the ferrous ions in the aqueous solution is equal to about two to about eight times the molar concentration of the contaminants; substantially all of the ferrous ions in the solution are oxidized to ferric ions within a period of less than about 15 minutes; step (a) includes the steps of introducing air into the solution at a rate of about 2 to about 8 l air per about 1000 ppm ferrous ion present in the solution prior to step (a), and controlling the pH of the solution so that the pH of the solution is about 6.5 to about 9; and the total concentration of the contaminants in the effluent solution is less than about 5% of the concentration of the contaminants in the aqueous solution prior to step (a).

66. The method of claim 62 wherein the concentration of the ferrous ions in the aqueous solution is equal to about four to about six times the molar concentration of the contaminants; substantially all of the ferrous ions in the solution are oxidized to ferric ions within a period of less than about 10 minutes; step (a) includes the steps of introducing air into the solution at a rate of about 4 to about 10 l air per about 1000 ppm ferrous ion present in the solution prior to step (a), and controlling the pH of the solution so that the pH of the solution is about 7.5 to about 8; and the total concentration of the contaminants in the effluent solution is less than about 1% of the concentration of the contaminants in the aqueous solution prior to step (a).

67. The method of claim 62 wherein a portion of the contaminants are beryllium ions.

68. The method of claim 62 wherein substantially all of the ferrous ions in the solution are oxidized to ferric ions within a period of less than about 15 minutes.

69. The method of claim 62 wherein substantially all of the ferrous ions in the solution are oxidized to ferric ions within a period of less than about 10 minutes.

70. The method of claim 62 wherein step (a) includes the step of introducing air into the solution at a rate of about 2 to about 8 l per about 1000 pm ferrous ion present in the solution prior to step (a).

71. The method of claim 62 wherein step (a) includes the step of controlling the pH of the solution so that the pH of the solution is about 6.5 to about 9.

72. The method of claim 62 wherein step (a) includes the step of controlling the pH of the solution so That the pH of the solution is about 7.5 to about 8.

73. The method of claim 62 wherein the total concentration of the contaminants in the effluent solution is less than about 5% of the concentration of the contaminants in the aqueous solution prior to step (a).

74. The method of claim 62 wherein the total concentration of the contaminants in the effluent solution is less than about 1% of the concentration of the contaminants in the aqueous solution prior to step (a).

75. The method of claim 62 further comprising the step of adding ferrous ions to the aqueous solution to increase the ferrous ion-contaminant molar ratio to at least about 1:1.

76. The method of claim 62 further comprising the step of adding ferrous ions to the aqueous solution to increase the ferrous ion-contaminant molar ratio to at least about 4:1.

77. The method of claim 62 further comprising the step of adding ferrous ions to the aqueous solution to increase the ferrous ion-contaminant molar ratio to at least about 8:1.

78. A method for removing volatile organics and one or more contaminants selected from the group consisting of aluminum ions, beryllium ions, and mixtures thereof from an aqueous solution comprising the volatile organics, the contaminants, and ferrous ions, the method comprising the steps of:
(a) rapidly oxidizing substantially all the ferrous ions in the solution to ferric ions so as to rapidly form a substantially completely amorphous precipitate comprising a substantial portion of ferric hydroxide and a substantial portion of the contaminants;
(b) removing a substantial portion of the volatile organics by introducing a gas into the solution at a rate sufficient to achieve an average volumetric flux ratio of gas to water of at least about 20; and
(c) separating the precipitate from the solution so as to form an effluent solution having a reduced contaminant and volatile organic concentration, wherein steps (a) and (b) are performed simultaneously and include the steps of introducing air into the solution at a rate of about 1 to about 10 l air per about 1,000 ppm ferrous ion present in the solution prior to step (a), and controlling the pH of the solution so that the pH of the solution is about 6 to about 9.5; substantially all of the ferrous ions in the solution are oxidized to ferric ions within a period of less than about 30 minutes; and the total concentration of the contaminants in the effluent solution is less than about 10% of the concentration of the contaminants in the aqueous solution prior to step (a), and the concentration of the volatile organics in the effluent is less than about 20% of the concentration of the volatile organics in the aqueous solution prior to step (b).

79. The method of claim 78 wherein steps (a) and (b) include the step of mixing the aqueous solution.

80. The method of claim 78 further comprising the steps of:
(d) introducing additional ferrous ions into the effluent solution to form a modified effluent solution;
(e) rapidly oxidizing substantially all the ferrous ions in the modified effluent solution to ferric ions so as to rapidly form a second substantially completely amorphous precipitate comprising a substantial portion of ferric hydroxide and a substantial portion of any contaminant present in the effluent solution; and
(f) separating the second precipitate from the modified effluent solution so as to form a second effluent solution having a contaminant concentration less than the contaminant concentration of the effluent solution.

81. The method of claim 78 further comprising the steps of introducing additional gas into the effluent solution at a rate sufficient to achieve an average volumetric flux ratio of gas to water of at least about 20 so that any volatile organic content to the effluent is further reduced.

82. The method of claim 78 further comprising the steps of:
(d) introducing additional ferrous ions into the effluent solution to form a modified effluent solution;
(e) rapidly oxidizing substantially all the ferrous ions in the modified effluent solution to ferric ions so as to rapidly form a second substantially completely amorphous precipitate comprising a substantial portion of ferric hydroxide and a substantial portion of any contaminant present in the effluent solution;
(f) introducing additional gas into the effluent solution at a rate sufficient to achieve an average volumetric flux ratio of gas to water of at least about 20; and
(g) separating the precipitate from the modified effluent solution so as to form a second effluent solution having a contaminant and volatile organic concentration less than the contaminant volatile organic concentration of the effluent solution.

83. The method of claim 78 wherein the contaminant is beryllium ions.

84. A method for removing volatile organics and contaminants selected from the group consisting of aluminum ions, beryllium ions, cyanide ions, and mixtures thereof from an aqueous solution comprising the volatile organics, the contaminants, and ferrous ions, the method comprising the steps of:
(a) rapidly oxidizing substantially all the ferrous ions in the solution to ferric ions so as to rapidly form a substantially completely amorphous precipitate comprising a substantial portion of ferric hydroxide and a substantial portion of the contaminants;
(b) removing a substantial portion of the volatile organics by introducing a gas into the solution at a rate sufficient to achieve an average volumetric flux ratio of gas to water of at least about 20; and
(c) separating the precipitate from the solution so as to form an effluent solution having a reduced contaminant and volatile organic concentration, wherein a portion of the contaminants are cyanide ions and a portion of the contaminants are selected from the group consisting of aluminum ions, beryllium ions, and mixtures thereof; the molar ratio of the ferrous ions to the contaminants in the aqueous solution is about 1:1 to about 10:1; substantially all of the ferrous ions in the solution are oxidized to ferric ions within a period of less than about 30 minutes; steps (a) and (b) are performed simultaneously and include the steps of introducing air into the solution at a rate of about 1 to about 10 l air per about 1,000 ppm ferrous ion present in the solution prior to step (a), and controlling the pH of the solution so that the pH of the solution is about 6 to about 9.5; the substantially completely amorphous precipitate comprises a substantial portion of the cyanide ions; the effluent solution has a substantially reduced concentration of the cyanide ions; and the total concentration of the contaminants in the effluent solution is less than about 10% of the concentration of the contaminants in the aqueous solution prior to step (a), and the concentration of the volatile organics in the effluent is less than about 20% of the concentration of the volatile organics in the aqueous solution prior to step (b).

85. The method of claim 84 further comprising the step of adding ferrous ions to the aqueous solution to increase the ferrous ion-contaminant molar ratio to at least about 1:1.

86. The method of claim 84 wherein a portion of the contaminants are beryllium ions.

87. The method of claim 84 further comprising the steps of:
   (d) introducing additional ferrous ions into the effluent solution to form a modified effluent solution;
   (e) rapidly oxidizing substantially all the ferrous ions in the modified effluent solution to ferric ions so as to rapidly form a second substantially completely amorphous precipitate comprising a substantial portion of ferric hydroxide and a substantial portion of any contaminant present in the effluent solution; and
   (f) separating the second precipitate from the modified effluent solution so as to form a second effluent solution having a contaminant concentration less than the contaminant concentration of the effluent solution.

88. The method of claim 84 further comprising the steps of introducing additional gas into the effluent solution at a rate sufficient to achieve an average volumetric flux ratio of gas to water of at least about 20 so that any volatile organic content to the effluent is further reduced.

89. The method of claim 84 further comprising the steps of:
   (d) introducing additional ferrous ions into the effluent solution to form a modified effluent solution;
   (e) rapidly oxidizing substantially all the ferrous ions in the modified effluent solution to ferric ions so as to rapidly form a second substantially completely amorphous precipitate comprising a substantial portion of ferric hydroxide and a substantial portion of any contaminant present in the effluent solution;
   (f) introducing additional gas into the effluent solution at a rate sufficient to achieve an average volumetric flux ratio of gas to water of at least about 20; and
   (g) separating the precipitates from the modified effluent solution so as to form a second effluent solution having a contaminant and volatile organic concentration less than the contaminant and volatile organic concentration of the effluent solution.

90. A method for removing volatile organics and contaminants selected from the group consisting of aluminum ions, beryllium ions, heavy metal ions, and mixtures thereof from an aqueous solution comprising the volatile organics, the contaminants, and ferrous ions, the method comprising the steps of:
   (a) rapidly oxidizing substantially all the ferrous ions in the solution to ferric ions so as to rapidly form a substantially completely amorphous precipitate comprising a substantial portion of ferric hydroxide and a substantial portion of the contaminants;
   (b) removing a substantial portion of the volatile organics by introducing a gas into the solution at a rate sufficient to achieve an average volumetric flux ratio of gas to water of at least about 20; and
   (c) separating the precipitate from the solution so as to form an effluent solution having a reduced contaminant and volatile organic concentration, wherein a portion of the contaminants are at least one heavy metal ion and a portion of the contaminants are selected from the group consisting of aluminum ions, beryllium ions, and mixtures thereof; the molar ratio of the ferrous ions to the contaminants in the aqueous solution is at least about 1:1; substantially all of the ferrous ions in the solution are oxidized to ferric ions within a period of less than about 30 minutes; steps (a) and (b) are performed simultaneously and include the steps of introducing air into the solution at a rate of about 1 to about 10 l air per about 1,000 ppm ferrous ion present in the solution prior to step (a), and controlling the pH of the solution so that the pH of the solution is about 6 to about 9.5; the substantially completely amorphous precipitate comprises a substantial portion of the heavy metal ions; the effluent solution has a substantially reduced concentration of the heavy metal ions; and the total concentration of the contaminants in the effluent solution is less than about 10% of the concentration of the contaminants in the aqueous solution prior to step (a), and the concentration of the volatile organics in the effluent is less than about 20% of the concentration of the volatile organics in the aqueous solution prior to step (b).

91. The method of claim 90 wherein a portion of the contaminants are beryllium ions.

92. The method of claim 90 further comprising the steps of:
   (d) introducing additional ferrous ions into the effluent solution to form a modified effluent solution;
   (e) rapidly oxidizing substantially all the ferrous ions in the modified effluent solution to ferric ions so as to rapidly form a second substantially completely amorphous precipitate comprising a substantial portion of ferric hydroxide and a substantial portion of any contaminant present in the effluent solution; and
   (f) separating the second precipitate from the modified effluent solution so as to form a second effluent solution having a contaminant concentration less than the contaminant concentration of the effluent solution.

93. The method of claim 90 further comprising the steps of introducing additional gas into the effluent solution at a rate sufficient to achieve an average volumetric flux ratio of gas to water of at least about 20 so that any volatile organic content to the effluent is further reduced.

94. The method of claim 90 further comprising the steps of:
   (d) introducing additional ferrous ions into the effluent solution to form a modified effluent solution;
   (e) rapidly oxidizing substantially all the ferrous ions in the modified effluent solution to ferric ions so as to rapidly form a second substantially completely amorphous precipitate comprising a substantial portion of ferric hydroxide and a substantial portion of any contaminant present in the effluent solution;
   (f) introducing additional gas into the effluent solution at a rate sufficient to achieve an average volumetric flux ratio of gas to water of at least about 20; and
   (g) separating the precipitates from the modified effluent solution so as to form a second effluent solution having a contaminant and volatile organic concentration less than the contaminant and volatile organic concentration of the effluent solution.

95. A method for removing volatile organics and contaminants selected from the group consisting of aluminum ions, beryllium ions, cyanide ions, heavy metal ions, and mixtures thereof from an aqueous solution comprising the volatile organics, the contaminants, and ferrous ions, the method comprising the steps of:
   (a) rapidly oxidizing substantially all the ferrous ions in the solution to ferric ions so as to rapidly form a substantially completely amorphous precipitate comprising a substantial portion of ferric hydroxide and a substantial portion of the contaminants;
   (b) removing a substantial portion of the volatile organics by introducing a gas into the solution at a rate sufficient to achieve an average volumetric flux ratio of gas to water of at least about 20; and
   (c) separating the precipitate from the solution so as to form an effluent solution having a reduced contaminant and volatile organic concentration, wherein a portion of the contaminants are cyanide ions and at least one heavy metal ion and a portion of the contaminants are selected from the group consisting of aluminum ions, beryllium ions, and mixtures thereof; the substantially completely amorphous precipitate comprises a substantial portion of the cyanide ions and the heavy metal ions; the effluent solution has a substantially reduced concentration of the cyanide ions and the heavy metal ions; the concentration of the ferrous ions in the aqueous solution is equal to about one to abut ten times the molar concentration of the contaminants; substantially all of the ferrous ions in the solution are oxidized to ferric ions within a period of less than about 30 minutes; steps (a) and (b) are performed simultaneously and include the steps of introducing air into the solution at a rate of about 1 to about 10 l air per about 1,000 ppm ferrous ion present in the solution prior to step (a), and controlling the pH of the solution so that the pH of the solution is about 6 to about 9.5; and the total concentration of the contaminants in the effluent solution is less than about 10% of the concentration of the contaminants in the aqueous solution prior to step (a), and the concentration of the volatile organics in the effluent is less than about 20% of the concentration of the volatile organics in the aqueous solution prior to step (b).

96. The method of claim 95 wherein a portion of the contaminants are beryllium ions.

97. The method of claim 95 further comprising the steps of:
   (d) introducing additional ferrous ions into the effluent solution to form a modified effluent solution;
   (e) rapidly oxidizing substantially all the ferrous ions in the modified effluent solution to ferric ions so as to rapidly form a second substantially completely amorphous precipitate comprising a substantial portion of ferric hydroxide and a substantial portion of any contaminant present in the effluent solution; and
   (f) separating the second precipitate from the modified effluent solution so as to form a second effluent solution having a contaminant concentration less than the contaminant concentration of the effluent solution.

98. The method of claim 95 further comprising the steps of introducing additional gas into the effluent solution at a rate sufficient to achieve an average volumetric flux ratio of gas to water of at least about 20 so that any volatile organic content to the effluent is further reduced.

* * * * *

UNITED STATES PATENT AND TRADEMARK OFFICE
CERTIFICATE OF CORRECTION

PATENT NO. : 5,045,214

DATED : September 3, 1991

INVENTOR(S) : Douglas T. Walker

It is certified that error appears in the above-identified patent and that said Letters Patent is hereby corrected as shown below:

Title page, page 2, column 1, delete "4,742,085" should read -- 4,724,085 --.

Title page, page 2, col. 2, line 17, delete first occurrence of "Colloid".

Claim 12, column 39, line 24, after "pH of" insert -- the solution is about 7.5 to about 8; and the total concentration of the contaminants in the effluent solution is less than about 1% of the concentration of the contaminants in the aqueous solution prior to step (a). --

Claim 13, column 39, line 27, replace "in" with -- into --.

Claim 25, column 40, line 9, "of" should be -- for --; lines 23 and 24, after "the" delete "contaminant concentration, wherein a portion of the".

Claim 50, column 42, lines 63 and 64, after "wherein" delete "the contaminants further comprise".

Claim 95, column 49, line 31, replace "abut" with -- about --.

Signed and Sealed this

Twentieth Day of April, 1993

Attest:

MICHAEL K. KIRK

*Attesting Officer*     *Acting Commissioner of Patents and Trademarks*